United States Patent
Rosenbluth et al.

(10) Patent No.: US 6,377,281 B1
(45) Date of Patent: Apr. 23, 2002

(54) LIVE PERFORMANCE CONTROL OF COMPUTER GRAPHIC CHARACTERS

(75) Inventors: Steven Rosenbluth, Burbank; Jeffrey S. Forbes, Valencia, both of CA (US); Timothy Magill, St. Petersburg, FL (US)

(73) Assignee: The Jim Henson Company, New York, NY (US)

( * ) Notice: Subject to any disclaimer, the term of this patent is extended or adjusted under 35 U.S.C. 154(b) by 0 days.

(21) Appl. No.: 09/506,679

(22) Filed: Feb. 17, 2000

(51) Int. Cl.⁷ .............................. G06F 3/00; G06T 13/00
(52) U.S. Cl. ...................... 345/700; 345/706; 345/473; 707/500.1
(58) Field of Search ................................ 345/326, 327, 345/328, 339, 352, 358, 302, 419, 433, 473, 156, 157, 700, 704, 706, 716, 717, 719, 723, 730, 731, 764, 810, 856, 863, 619; 707/500.1

(56) References Cited

U.S. PATENT DOCUMENTS

| | | | | |
|---|---|---|---|---|
| 5,757,360 A | | 5/1998 | Nitta et al. ................. | 345/156 |
| 5,818,461 A | | 10/1998 | Rouet et al. ................ | 345/473 |
| 5,923,337 A | * | 7/1999 | Yamamoto .................. | 345/473 |
| 5,977,968 A | | 11/1999 | Le Blanc .................... | 345/339 |
| 5,982,390 A | | 11/1999 | Stoneking et al. .......... | 345/474 |
| 6,011,562 A | | 1/2000 | Gagane et al. .............. | 345/473 |
| 6,115,053 A | * | 9/2000 | Perlin ........................ | 345/475 |

OTHER PUBLICATIONS

Data sheet, Datel single output high density 2"×1" 15 watt DC/DC converters, publicly available prior to Feb. 17, 2000.*

Data sheet, Bourns EN rotary optical encoder, publicly available prior to Feb. 17, 2000.*

Data sheet, Hewlett Packard high CMR, high speed TTL compatible optocouplers, publicly available prior to Feb. 17, 2000.*

Data sheet, Maxim improved 8 channel/dual 4 channel CMOS analog multiplexers, publicly available prior to Feb. 17, 2000.*

Data sheet, Magnecraft single in line package reed relay, publicly available prior to Feb. 17, 2000.*

Data sheet, International Power DC power suplies, publicly available prior to Feb. 17, 2000.*

"Big1 Program File", publicly available prior to Feb. 17, 2000.*

(List continued on next page.)

*Primary Examiner*—Crescelle N dela Torre
(74) *Attorney, Agent, or Firm*—Hickman Palermo Truong & Becker LLP

(57) ABSTRACT

A method and apparatus are provided for performing a computer graphic character live in a manner homologous to a live puppetry performance. Character representation information is created and stored using a first computer. Performer movement information is received at the first computer from a manual input device that receives live manual manipulations and converts the manipulations into the performer movement information. Character motion information is created and stored based on combining the performer movement information with the character representation information. The character motion information is communicated in real time to a second computer. The second computer converts the character motion information into movements of a computer graphic character, which is displayed substantially synchronized to the live manual manipulations. Control objects define elements of the manual input device. Actuators define movable elements of the computer graphic character. Expression objects tie controls to actuators and may be used to develop and store complex character expressions. The system may also drive robotic or electromechanically actuated puppet creatures.

28 Claims, 18 Drawing Sheets

OTHER PUBLICATIONS

"Performance Editor, Release 1.00", publicly available prior to Feb. 17, 2000.*

Big1 Performance Customisers, publicly available prior to Feb. 17, 2000.*

Big1 Signals Field Guide, publicly available prior to Feb. 17, 2000.*

Brochure, "The Production Plant", SIGGRAPH Conference, 2000.*

Cyber Research, PCM–DAS 16x Register Map, received May 21, 1998.

Data sheet, National Semiconductor MM54HC153/MM74HC153 dual 4–input multiplexer, 1999.

D. Huber, "Sync'ing your software," PC Recording Quarterly, Feb. 1998, pp. 86–89.

"Big1 User Manual," Aug. 23, 1990.

D. Houseman, "Analogue connections to the Big1," Dec. 3, 1993.

D. Houseman, "Big1 setup notes," Aug. 23, 1994.

D. Houseman, "Big1 repair sheets," Oct. 13, 1992.

D. Houseman, "Big1 Notes," Sep. 25, 1992.

D. Houseman, "Big1 spares kit list," Jan. 28, 1994.

Big1 "Edit Suite Short–Keys Strokes," Oct. 2, 1994.

M. Morrison, "Becoming a Computer Animator," SAMS Publishing, 1997.

M. Stroud, "The Latest Toon Town Technology," Wired, Jan. 10, 2000.

Brochure, "Maya 2," Jun., 1999.

* cited by examiner

Fig. 56

LIVE PERFORMANCE CONTROL OF COMPUTER GRAPHIC CHARACTERS

FIELD OF THE INVENTION

The present invention generally relates to data processing. The invention relates more specifically to computer software and systems useful in controlling computer graphic characters and electromechanically actuated puppet characters as used in the production of motion pictures.

BACKGROUND OF THE INVENTION

In the performing arts, puppetry traditionally has been a manually performed art that relies on the skill, creativity, and coordinated movement of a human puppeteer who manipulates a passive, mechanical puppet. Sophisticated artificial characters or "creatures" that resemble puppets, developed by Jim Henson and The Jim Henson Company, offer a wide range of motion and character expression. However, generally they require a human performer to hold them or otherwise use close manual control. This is a disadvantage in certain types of motion picture productions that feature large or fully autonomous creatures that cannot be held by or otherwise directly manipulated by a human performer.

Partly in response to this problem, remotely controlled, robotic electromechanically actuated puppet creatures have been developed. An electromechanically actuated puppet may simulate any desired animal, human character, or other creature, real or imagined, of any size. Typically an electromechanically actuated puppet comprises: a movable skeleton made of metals or other rigid materials; servos, motors, hydraulics or other actuators that move parts of the skeleton (limbs, facial features, eyes, etc.); and a skin that covers the skeleton and simulates real skin, muscle, hair, etc. Electromechanically actuated puppets also offer the ability to control complex expressions involving numerous actuation points in a small area Electromechanically actuated puppets may be remotely controlled using a cable tether that connects a remote onboard computer to a control computer, or using a wireless link. Electromechanically actuated puppets have been featured in such motion pictures and television productions as "Babe," "George Of The Jungle," "Dr. Doolittle," "Animal Farm," and others.

Unfortunately, electromechanically actuated puppets are relatively costly, and require considerable time and skill to create, test, and debug. In some cases, the amount of time that a performer can spend in rehearsal time with the electromechanically actuated puppet is limited because of concerns about wearing out its mechanical parts. As a result, in past productions the performers of the electromechanically actuated puppets sometimes have had difficulty gaining familiarity with a new electromechanically actuated puppet. This is undesirable. It is desirable to have a way for the performer to have ample rehearsal time to create and test out expressions with less wear on the puppet.

Moreover, improvements in computer graphics technology and networking technology have lead to increased interest in creating and distributing performances of computer graphic (CG) characters. Unlike an electromechanically actuated puppet, a CG character is intangible and takes form only as an animated graphical display generated by a computer. CG characters may be created, for example, using 3D graphics computer software such as 3D Studio Max, commercially available from Kinetix, a unit of Autodesk, Inc. There is tremendous interest now in creating and performing CG characters for use in World Wide Web and video game content and productions. Conventional graphics software systems, however, require the performer to learn how to use the software in order to create expressions and performances for the CG characters. It is desirable to have a way for a performer to create expressions and performances for CG characters in a manner that is homologous to a puppetry performance, without having to use graphics software or other traditional computer input methods.

In particular, existing CG tools provide only low-level approaches for generating expressions and performances of characters. Typically they are complex, time consuming to use, and prone to user error. There is a need for a performance control system that offers users high-level configuration tools for rapid generation of expressions and performances.

Control systems used to manipulate electromechanically actuated puppets are known. For example, since approximately 1989, Jim Henson's Creature Shop of London, England, a unit of The Jim Henson Company, has used a computer system known as "Big1" to control performances of electromechanically actuated puppet characters, as described in the document, "Big1: User Manual," printed Aug. 23, 1990. Generally, the Big1 system comprises a dedicated, custom designed computer; a handset for providing manual input to the computer; a motor driver for receiving signals from the computer and driving motors of an electromechanically actuated puppet; a power supply; and an i/o unit known as Smarter Tool. The Big1 can provide real time control of 32 servos and 8 motor actuators by one puppeteer. The Jim Henson Company won an Academy Award for Technical Achievement for the design of this control system. Most recently the Big1 system was used in the production of "Jack Frost" and "Farscape."

In 1990 an edit suite called Performance Editor was developed which works in tandem with the Big1 control system to capture a performance of a puppeteer and edit a performance, to enable synchronization to a sound track for accurate lip-synching. The edit suite was first used in the production of the film "Babe," for which The Jim Henson Company won an Academy Award for Best Special Effects.

The Big1 system, however, has certain known disadvantages. For example, use of a custom, dedicated control computer causes problems in modifying the system to add new features and functions. Such a computer cannot be expanded in terms of speed, memory, or peripherals in an easy or cost-effective manner. All principal functionality executes on the control computer, resulting a monolithic architecture that provides a single point of failure. A monolithic software architecture, without an operating system, is also used, making distribution of program components impractical. This architecture has no memory protection, no multi-tasking, no device support, and no application programming interface. Hence, the system lacks modularity, and therefore is difficult to update, modify, or extend. It also cannot use widely available applications and tools that are available for other operating systems.

Another fundamental disadvantage of the Big1 system is that it is not readily usable with computer graphic (CG) characters.

Based on the foregoing, there is a need for a way for the performer to create and test out expressions more easily and rapidly.

There is also a need for a way for a performer to create expressions and performances for CG characters in a manner that is homologous to a puppetry performance, without having to use graphics software or other traditional computer input methods.

SUMMARY OF THE INVENTION

These needs, and other needs that will become apparent from the following description, are fulfilled by the present invention, which comprises, in one aspect, a method and apparatus for performing a computer graphic character live in a manner homologous to a live puppetry performance. Character representation information is created and stored using a first computer. Performer movement information is received at the first computer from a manual input device that receives live manual manipulations and converts the manipulations into the performer movement information. Character motion information is created and stored based on combining the performer movement information with the character representation information. The character motion information is communicated in real time to a second computer. The second computer converts the character motion information into movements of a computer graphic character, which is displayed substantially synchronized to the live manual manipulations. Control objects define elements of the manual input device. Actuators define movable elements of the computer graphic character. Expression objects tie controls to actuators and may be used to develop and store complex character expressions. The system may also drive robotic or electromechanically actuated puppet creatures.

In another aspect, the invention provides a method of performing a computer graphic character live. The method involves creating and storing character representation information in a first computer; receiving, at the first computer, performer movement information from a manual input device that receives live manual manipulations and converts the manipulations into the performer movement information; creating and storing character motion information based on combining the performer movement information with the character representation information; receiving the character motion information at a second computer; displaying the computer graphic character substantially synchronized to the live manual manipulations using the second computer and based on the character motion information.

In another aspect, the invention provides a computer system providing live performance control of one or more computer graphic characters, comprising a first computer comprising a character document that defines attributes of one or more characters and an expression generator that creates and stores character motion information based on attributes in the character documents; a transducer apparatus coupled to the first computer to provide digital information representing movement to the first computer as the transducer apparatus is moved; a second computer coupled to the first computer and comprising a character generating element configured to generate display information depicting the one or more computer graphic characters in response to and based on the digital information and the character motion information; and a graphic display device coupled to the second computer and configured to display the computer graphic characters using the display information.

In still another aspect, the invention provides a computer system providing live performance control of computer graphic characters, comprising a computer that stores one or more character documents that define attributes of the characters and comprising an expression generator that creates and stores character motion information based on attributes in the character documents; a transducer apparatus coupled to the computer to provide digital information representing movement to the computer as the transducer apparatus is moved; a character generating element in the computer that is configured to generate display information depicting the computer graphic characters in response to and based on the digital information and the character motion information received via a local communications link; and a graphic display device coupled to the computer and configured to display the computer graphic characters using the display information and using a character generation application and a 3D display application.

In yet another aspect, the invention provides a computer system providing live performance control of computer graphic characters, comprising a computer that stores a character document that defines attributes of one or more characters and comprising an expression generator that creates and stores character motion information based on attributes in the character document; a character generating element in the computer that is configured to generate display information depicting the computer graphic characters in response to and based on the character motion information and digital information that is received from a transducer apparatus coupled to the computer, wherein the digital information represents movement to the computer as the transducer apparatus is moved; and a graphic display device coupled to the computer and configured to display the computer graphic characters using the display information.

In yet another aspect, the invention encompasses a computer-readable medium carrying one or more sequences of instructions for performing a computer graphic character live, wherein execution of the one or more sequences of instructions by one or more processors causes the one or more processors to perform the steps of creating and storing character representation information in a first computer; receiving, at the first computer, performer movement information from a manual input device that receives live manual manipulations; creating and storing character motion information based on combining the performer movement information with the character representation information; receiving the character motion information at a second computer; displaying the computer graphic character substantially synchronized to the live manual manipulations using the second computer and based on the character motion information.

In still another aspect, the invention provides a method of producing a motion picture that includes a performance of a computer graphic character, comprising the steps of creating and storing character representation information in a first computer; receiving, at the first computer, performer movement information from a manual input device that receives live manual manipulations and converts the manipulations into the performer movement information; creating and storing character motion information based on combining the performer movement information with the character representation information; receiving the character motion information at a second computer; creating and storing a motion picture medium that includes a display of the computer graphic character substantially synchronized to the live manual manipulations using the second computer and based on the character motion information.

In yet another aspect, the invention provides a method of creating and storing information that defines a computer graphic character, comprising the steps of creating and storing character representation information in a first computer; receiving, at the first computer, performer movement information from a manual input device that receives live manual manipulations and converts the manipulations into the performer movement information; creating and storing character motion information based on combining the performer movement information with the character representation information; receiving the character motion information at a second computer; creating and storing a character model based on a display of the computer graphic character that is substantially synchronized to the live manual manipulations using the second computer and based on the character motion information.

Other features and aspects will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4C is a diagram of a screen display that is generated when a control is created or edited.

FIG. 5C is a diagram of a screen display generated when an expression, containing a control and actuators, is viewed.

DETAILED DESCRIPTION OF THE PREFERRED EMBODIMENT

A method and apparatus providing live performance control of computer graphic characters is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Structural Overview

Figure 1A:
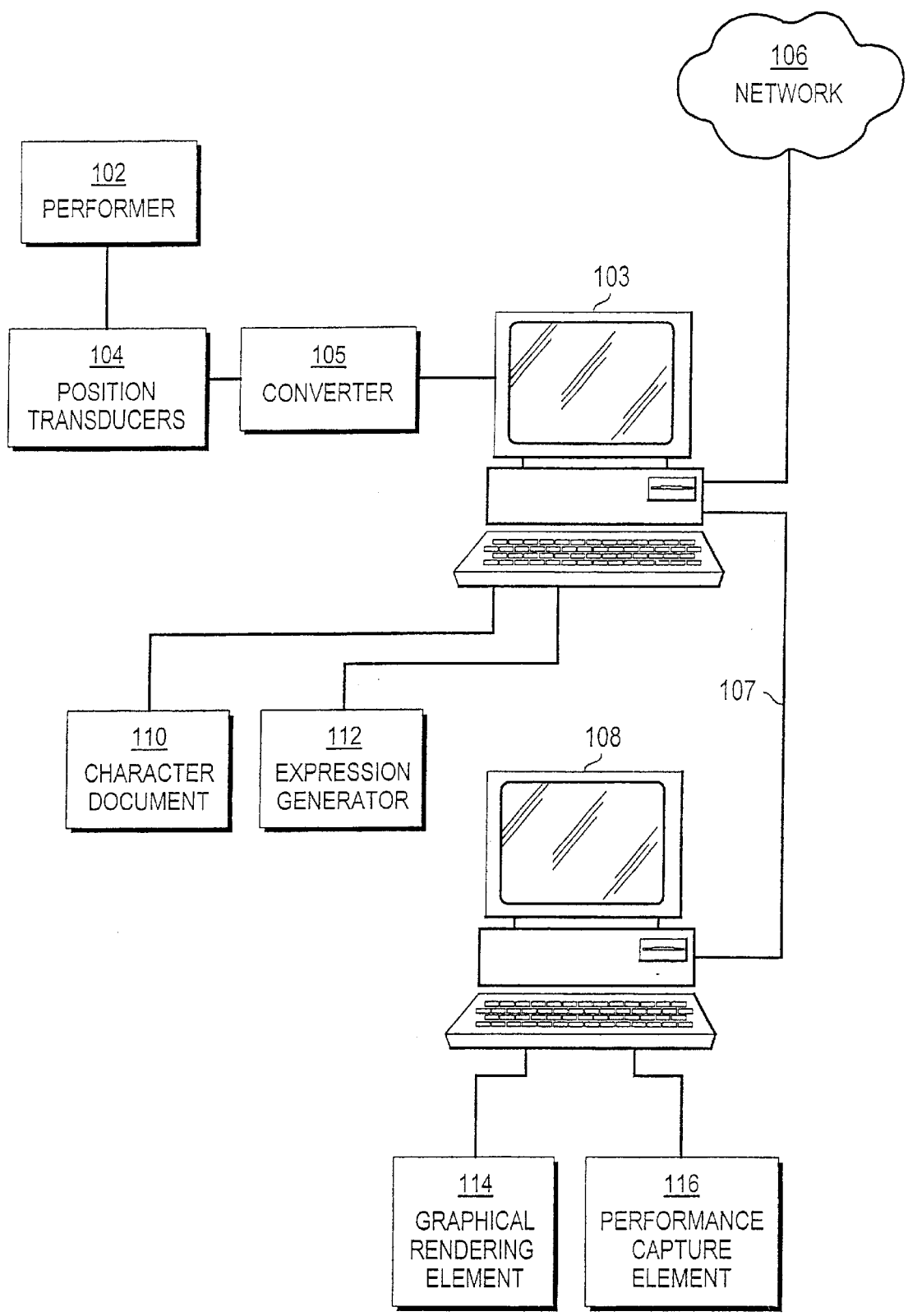
FIG. 1A is a block diagram of an embodiment of a performance control system.

FIG. 1A is a block diagram of an embodiment of a performance control system. Generally, a performer 102 may manually manipulate one or more position transducers 104, which are coupled through a converter 105 to control computer 103. In this context, the performer 102 is a puppeteer or other artist who is skilled at creating a performance of a conventional puppet or an electromechanically actuated puppet of the type developed by The Jim Henson Company, or another similar artificial creature.

Position transducers 104 may comprise one or more analog position transducer potentiometers mounted in a mechanical assembly that simulates the motions used by a puppeteer to manipulate a conventional puppet. Thus, the term "position transducers" is here used broadly to refer both to sticks, waldos, footswitches, and other mechanical elements or physical controls that are directly manipulated by a performer 102, and the electromechanical transducers that convert mechanical motion of the mechanical elements into proportional electrical signals.

For example, the hands of performer 102 are received in left-hand and right-hand mechanical assemblies that comprise levers, rotatable shafts, tiltable plates, and related equipment. The mechanical assemblies may comprise a gyro waldo, stick, arm waldo, etc. The mechanical assemblies can be manually manipulated through a range of positions that are homologous to the positions through which the hands of a performer move when manipulating a conventional hand puppet, electromechanically actuated puppet or other artificial creature.

In one embodiment, a stick is used to control gross motor functions of body parts of the creature, and a waldo is used to control opening and closing the mouth and to control other facial features of the creature. A stick typically has a left/right movement transducer, a forward/back movement transducer, a twist transducer, and one or more finger transducers associated with upward or downward movement of a performer's fingers. The stick may also have a thumb control that is often used to perform eye movements. A waldo may have a thumb transducer, jaw transducer, palate transducer, up/down movement transducer, left/right movement transducer, and twist transducer. Shoulder, elbow, wrist, and other movements may be accommodated and associated with transducers.

Alternatively, other devices may be used to convert performance movements into electrical signals. For example, a performer could wear one or more data gloves. A data glove is a conventional glove fitted with sensors that can convert finger and hand motion into electrical signals. A performer could also use one or more joysticks, pushbuttons, or other elements to receive mechanical movement and generate electrical signals.

Such physical controls are distinct from virtual controls, referred to herein as "controls" or "control objects," which are, broadly speaking, software elements that represent physical controls.

Analog output signals generated by position transducers 104 are converted by converter 105 into digital signals that may be processed by computer 103. For example, converter 105 may comprise one or more analog-to-digital converters, or an analog multiplexer in combination with an analog-to-digital converter. In one preferred embodiment, a PC-MCIA card in computer 103 contains a 64-to-16 channel multiplexer, accommodating input from 64 transducers, with 12-bit digital output from analog-to-digital conversion.

Computer 103 is a personal computer, workstation, or similar data processing system having a central processing unit that executes stored programs, main memory for storing program instructions and data, and non-volatile storage, such as disk storage, for storing information relating to a particular character performance. Computer 103 is coupled to converter 105 and receives converted signals from position transducers 104. Computer 103 also executes one or more application programs that allow performer 102 to create, store, edit, manage, retrieve, and re-use performance information. In a preferred embodiment, computer 103 is a portable laptop computer with PCMCIA expansion ports, a 32-bit CPU capable of at least 226 MHz, and at least 192 Mbytes RAM. A desktop computer may also be used.

In an embodiment, the performance information is stored in the form of a character document 110. The character document 110, discussed in more detail below, generally comprises a set of object values that define expressions of computer graphic characters and specific parameters associated with the characters. A character document 110 is associated with one or more characters.

Expression generator 112 is one or more software elements that enable a performer to define complex character expressions in terms of values or movements of one or more position transducers. Each expression may be associated with a symbolic label, e.g., "Kooky Smile," "Wicked Scowl," etc. Information defining expressions is stored in non-volatile storage of computer 103. Thereafter, the performer can call up and re-use a character document containing complex expressions by selecting its label. Further description of expression generator 112 is provided below.

An additional computer, not shown, may be coupled to the network for use by an administrator. Further, in another embodiment, a second computer may be used in addition to computer 103 for use by a technician who assists performer 102 during a performance. The second computer executes the GUI client, and typically is a laptop computer that is physically networked to the system using Ethernet. This embodiment has been found useful, as an example, because it may be inconvenient for performer 102 to remove his or her hands from transducers 104 and move to computer 103 to adjust parameter settings.

Computer 103 may also interface to a time code generator for the purpose of synchronizing its operation to other devices, or other media such as a pre-recorded audio track, using time code data such as SMPTE time code. Computer 103 may also interface to a separate sound station computer having sound editing software, e.g., SoundEdit 16, for creating and editing a sound track for coordination with a performance.

Figure 1B:
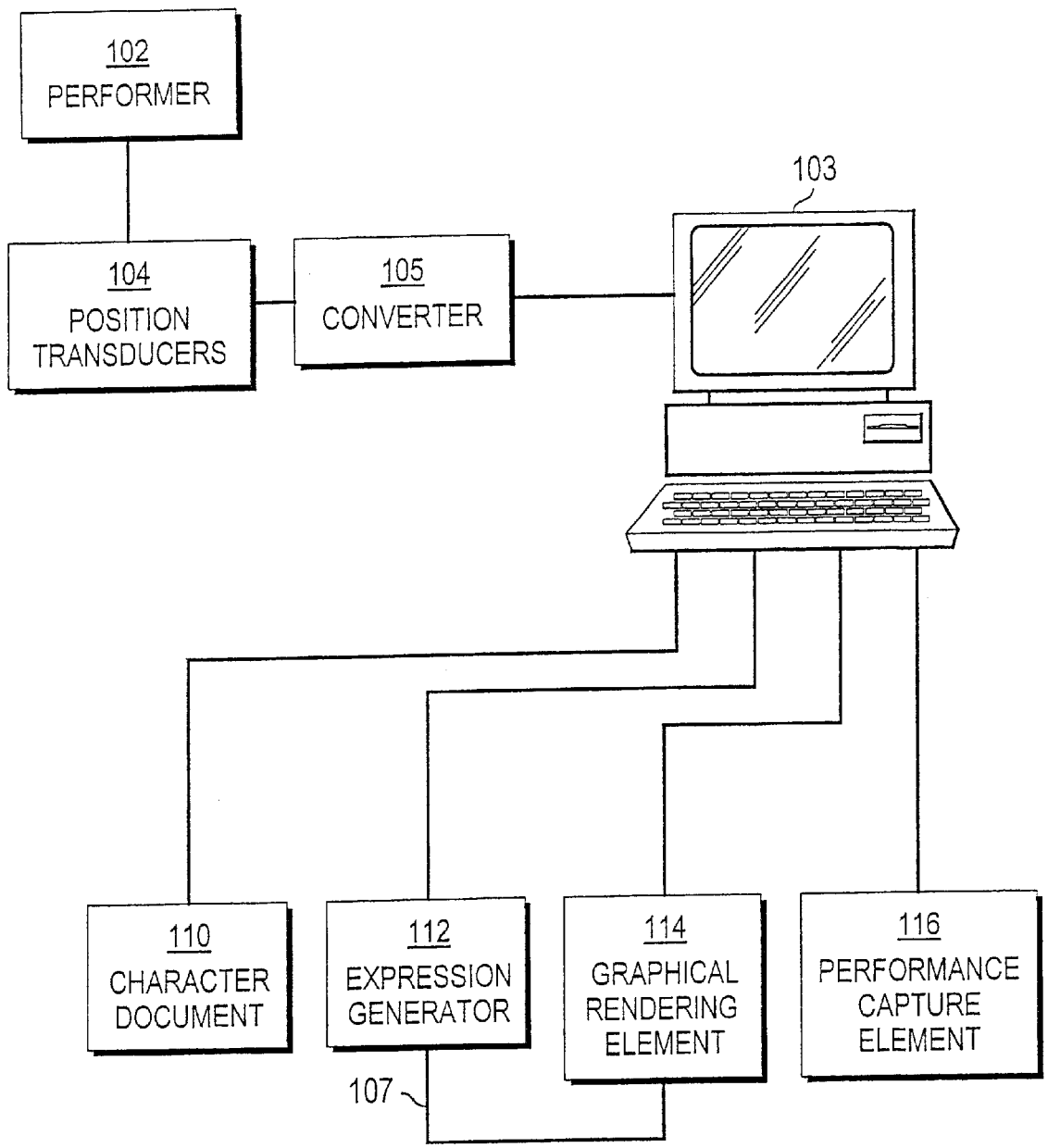
FIG. 1B is a block diagram of another embodiment of a performance control system.
Figure 1C:
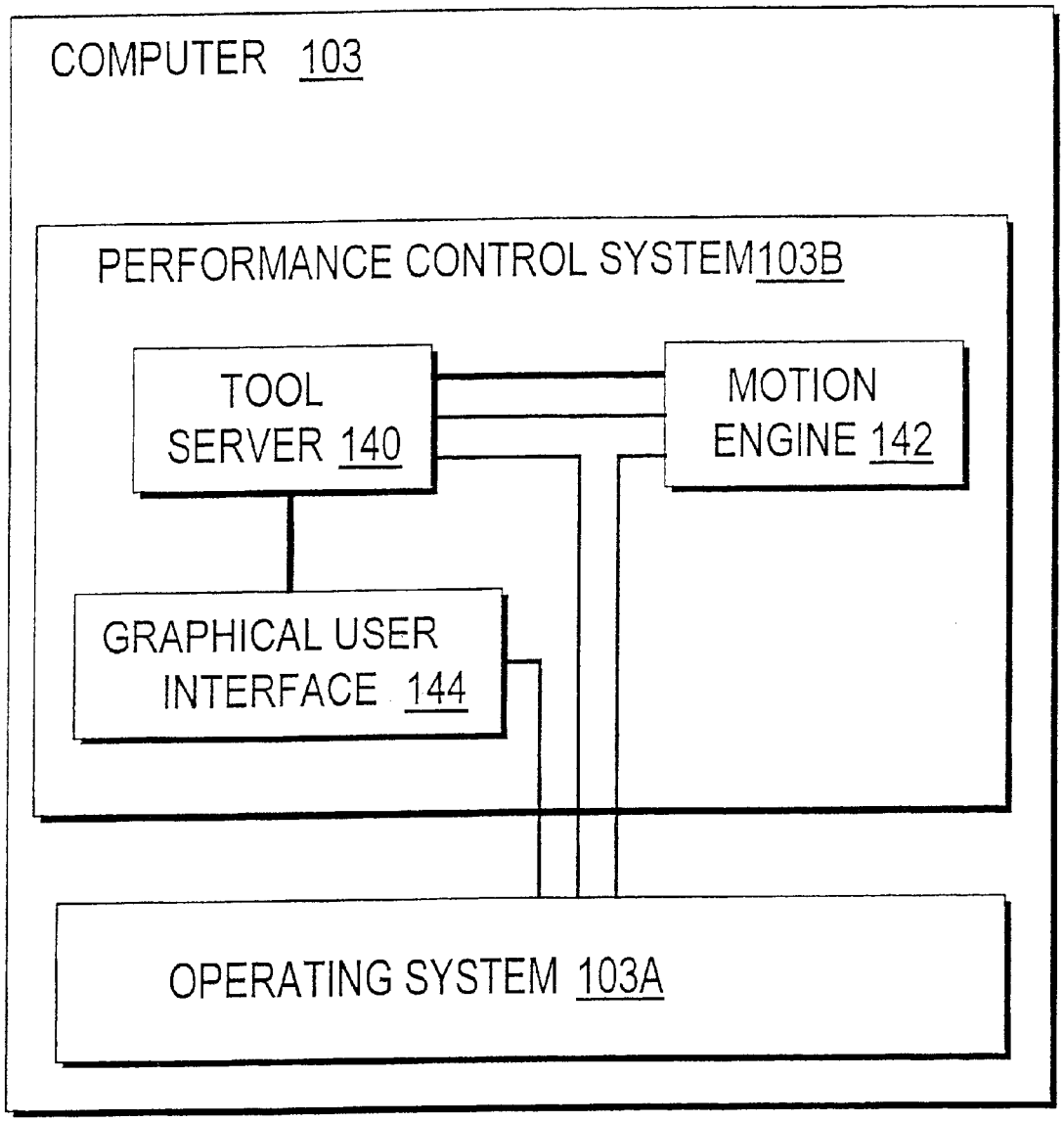
FIG. 1C is a block diagram of a preferred embodiment of software programs that are executed by a control computer.

FIG. 1C is a block diagram of a preferred embodiment of software programs that are executed by computer 103. In this embodiment, computer 103 executes a real-time operating system 103A, such as RTLinux, RTOS, QNX, etc., and a performance control system ("PCS") 103B.

Operating system 103A may include associated processes that support operations of PCS 103B. For example, in a preferred embodiment that uses real time (RT) LINUX as the operating system, operating system 103A also includes a graphics server such as XF86, a window manager such as FVWM, KWM, or Enlightenment, sound software elements such as OSS or Advanced Linux Sound Architecture (ALSA), and utilities (e.g., find, lpr for printing, Magic Filter for printing, the "bash" shell for scripting, NFS for file sharing, top for process management, etc.). Other user applications may be provided to form a practical and complete system, e.g., Netscape Navigator, Wordperfect, Netware, etc.

PCS 103B is an example of an implementation of expression generator 112. PCS 103B generally comprises one or more computer programs or processes that carry out the functions described further in this document. Generally, PCS 103B comprises three (3) processes, namely character tool server ("tool server") 140, motion engine 142, and graphical user interface (GUI) 144. Tool server 140 and motion engine 142, described further below, may share memory, and generally comprise logic that acts as an intermediary between the performer and viewer 108. PCS 103B may be implemented as one or more software application programs written, for example in C, C++, Java, etc. Object-oriented development is favored and facilitates encapsulating controls, actuators, expressions, and other abstractions in programmatic objects.

Tool server 140 manages character documents 110 and all constituent objects such as controls, expressions and actuators. Tool Server 140 automatically connects itself to and manages one or more GUI client processes, such as graphical user interface 144. Tool Server 140 and graphical user interface 144 communicate using a lightweight, pre-defined network protocol that permits use of multiple GUI client processes.

Motion engine 142 continuously receives control inputs from converter 105 in real time and processes them into actuator values that are sent to the ROC or a ROC emulator. When a ROC is used with an electromechanically actuated puppet, motion engine 142 also continually receives feedback information ("telemetry") from the ROC. Enhanced expression algorithms, described further below, enable the use of compound mechanisms that yield more complex movements. As a result, puppeteers gain finer control of expressions during setup and performance. Preferably, motion engine 142 is optimized for use with high-resolution actuators.

Failsafe mechanisms such as pre-defined maximum and minimum position values provide ways to prevent damage to an electromechanically actuated puppet or those who work with it. Other failsafe mechanisms include: CRC data packets to insure data integrity; wire-break detection; gain ramps that enable a technician to bring groups of gain values to "0"; and collision avoidance techniques.

In an alternative embodiment, computer 103 is a multiple processor computer and motion engine 142 has multiple processes that operate in a background mode. This structure enables motion engine 142 to process multiple channels of motion control in parallel, or process multiple characters in parallel. One motion engine can be shared by several performers, and can grow dynamically to accommodate increasing processing demands. Alternatively, several motion engines can execute on separate systems that are networked together.

Graphical user interface 144 may be manipulated by a puppeteer or a technician to access the functions of tool server 140 and motion engine 142. Graphical user interface 144 may comprise Motif, TCL-TK, The X Window System running the GTK+graphical toolkit, etc. Preferably many instances of graphical user interface 144 can run concurrently on any computer that is coupled to network 106. For example, a technician can tune expressions and actuator limits during a performance. Graphical user interface updates are automatically synchronized between networked machines, so work can be done at any machine and it will appear on all GUI clients.

Thus, principal functions of PCS 103B include receiving data from transducers 104 and converter 105, pre-processing the data into information that may be used by viewer 108, and creating and storing definitions of complex character expressions.

Separation of functionality among tool server 140, motion engine 142, and graphical user interface 144 advantageously improves modularity of the system, so that each element may be developed, tested, and debugged separately. Further, changes and upgrades are more simple.

In one embodiment, computer 103 is coupled to network 106 through an appropriate network interface card or similar interface. Network 106 is a local area network, wide area network, one or more internetworks, etc. For example, network 106 may be an Ethernet LAN that carries UDP messages, an intranet that uses TCP/IP, or the global, packet-switched internetworks known as the Internet. Network 106 enables other computers of technicians, administrators, etc., to connect together and share data and files with computer 103. For example, using an appropriate Internet client computer, an administrator can connect to and manage the system from thousands of miles away from a studio shoot at which the system is being used.

Computer 103 is coupled to viewer 108 by a link 107, which provides a high-speed medium for communications of messages and data from computer 103 to viewer 108. A link transceiver interfaces link 107 to computer 103. In an alternate embodiment, computer 103 has a link transceiver that is connected to an electromechanically actuated puppet by link 107 in the logical position of viewer 108. In this embodiment, servos and motors in the electromechanically actuated puppet are actuated under control of a remote onboard computer (ROC) within the electromechanically actuated puppet. The ROC may comprise a PC-104 size single-board computer, or equivalent. The electromechanically actuated puppet may also contain telemetry transducers that sense temperature, hydraulic fluid pressure, current draw, battery voltage, etc., in the electromechanically actuated puppet and provide feedback to computer 103. Preferably link 107 provides bi-directional, full-duplex communications.

Logically, computer 103 and viewer 108 or an electromechanically actuated puppet communicate over link 107 using a lightweight protocol that is optimized for communication of character actuator position information ("ROC protocol"). At the transport layer of link 107, UDP may serve as a communication protocol underlying the ROC protocol. An embodiment of a ROC protocol is described further in connection with FIG. 6. At the physical layer the link 107 may operate using Ethernet protocol, RS-232 or RS-422 serial signaling, and may use wire, optical fiber, or radio frequency ("RF") signaling, e.g., via a spread spectrum serial modem is provided. An optical link is advantageous in the studio production environment, which is typically saturated by electromagnetic radiation from various devices that are used in the production of motion pictures and television products. RF links may be used for all communications of separate elements of the system. If the character is used in a shot or environment in which wires linking the character to the system are undesirable, an RF link may be preferable.

Viewer 108 is a computer workstation, personal computer, or similar data processing system that serves as a rendering and display station for computer graphic characters that reproduce character positions performed by performer 102 using position transducers 104. In one embodiment, viewer 108 executes a graphical rendering element 114 and a performance capture element 116. Graphical rendering element 114 monitors a data stream arriving from computer 103 over link 107 and generates one or more computer graphic characters on a display unit of viewer 108. In one embodiment, viewer 108 is an Intergraph TDZ 2000 GL2 graphics workstation running Windows NT and 3D Studio Max R3. Platforms that use Linux, Irix, etc., may also be used. Also, in other embodiments, viewer 108 may comprise graphics software that does not have modeling functions, e.g., Filmbox, Alive, etc.

An advantage of this architecture is that only one analog-to-digital conversion occurs in the entire system. Accordingly, degradation of signals cannot occur, e.g., at analog interfaces. This yields the least possible noise and the greatest stability.

Figure 1D:
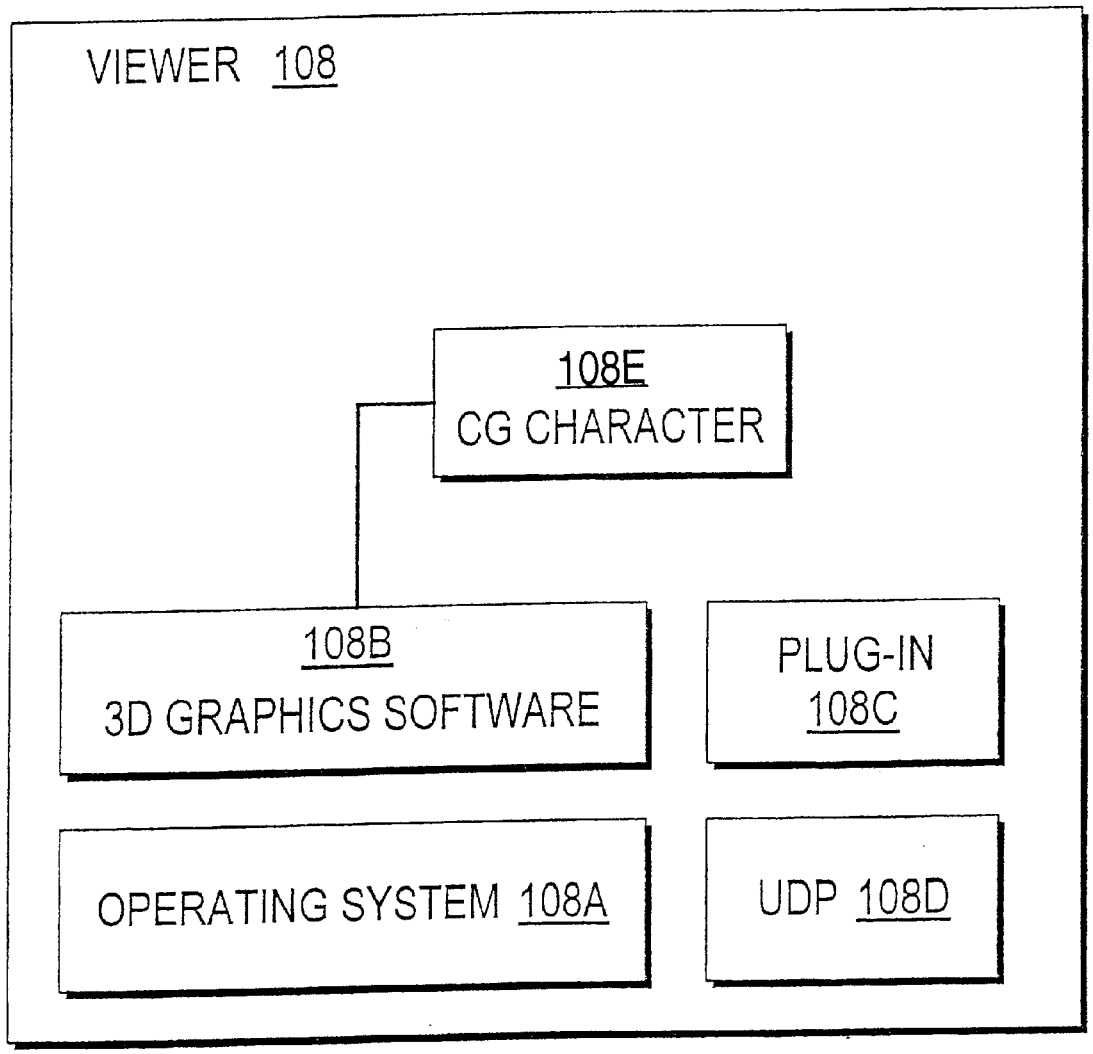
FIG. 1D is a block diagram of an embodiment of a software architecture that may be used for a viewer.

FIG. 1D is a block diagram of an embodiment of a software architecture that may be used for viewer 108. In this embodiment, viewer 108 executes an operating system 108A, which may be any appropriate personal computer or workstation operating system, e.g., MacOS, Microsoft Windows, SunSoft Solaris, etc. Preferably the operating system includes or executes in conjunction with a UDP element 108D that can send and receive UDP network messages. UDP element 108D may be a protocol stack, driver, or other element integral to operating system 108A, or a separate software element. Under control of operating system 108A, viewer 108 executes 3D graphics software 108B, which is an example of graphic rendering element 114 of FIG. 1A, FIG. 1B. In an embodiment, 3D graphics software 108B is a commercially available three-dimensional computer graphics and animation program, such as "Alive" (by Protozoa), "3D Studio Max" (by Discreet), "Maya" (Alias).

3D graphics software 108B is used to create and store one or more computer graphic characters ("CG characters") 108E at viewer 108. Each CG character 108E comprises data values that are created and stored using graphics software 108B and that the graphics software can retrieve, interpret, and render into a visually displayed graphical character. An example of a CG character is a 3D graphical representation of Kermit The Frog. A CG character 108E may comprise virtual lips, morphs, virtual arms and legs, etc. Thus, a CG character 108E may correspond to a physical electromechanically actuated puppet character, so that a puppeteer can use both with equal facility.

In an alternate embodiment, the functions described in this document for computer 103 and viewer 108 are carried out using one computer system, as shown in FIG. 1B. Separate computers are not required. In either embodiment, viewer 108 and performance control system 103B communicate using a UDP network connection. In the embodiment of FIG. 1A, in which a separate viewer computer is used, UDP messages are carried over link 107 using Ethernet. In the embodiment of FIG. 1B, viewer 108 communicates with performance control system 103B using a local UDP network socket.

Performance Control System

Performance control system 103B may have numerous functions that facilitate defining, storing, retrieving, and re-using performances and expressions of computer graphic characters. Generally, using PCS 103B to create a performance involves setting up actuators, setting up controls, creating expressions, and creating the performance. Live performance of a character may also involve incorporating pre-recorded character motion information based on an edit suite. These steps may be carried out in the foregoing sequence or in a different sequence, although a performance requires creating and storing at least one control, one expression, and one actuator.

Functional Overview

Figure 3A:
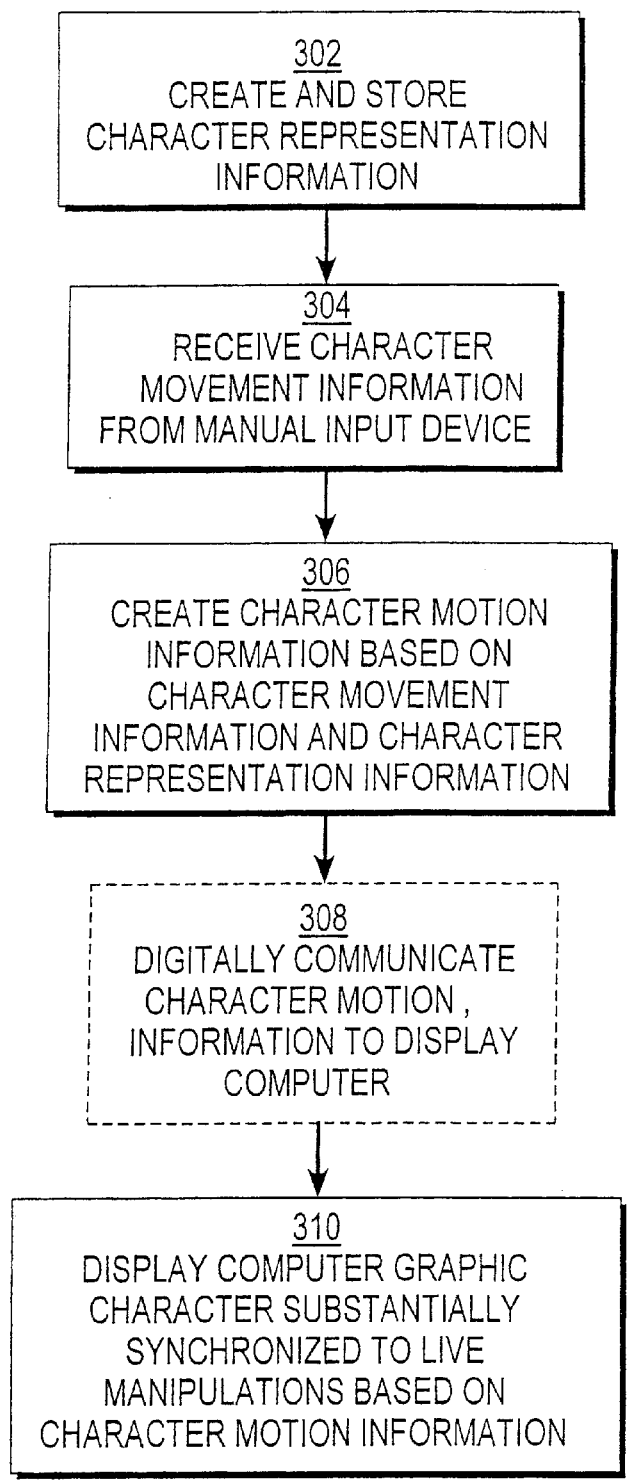
FIG. 3A is a flow diagram of a method of performing a computer graphic character live.

FIG. 3A is a flow diagram of a method of performing a computer graphic character live. FIG. 3A broadly expresses the fundamental steps used in performing a computer graphic character using the system disclosed in this document. In this description, the following terminology is used: an input potentiometer of a creature is a "physical control"; a corresponding software object is a "control"; a hobby servo of a creature is a "physical actuator"; a corresponding software object is an "actuator."

Generally, in one embodiment, raw input transducer data arrives and is stored in a device driver, represented as raw input channel data. Inputs are analog or binary. Analog inputs are stored as scalar values, and Binary inputs are stored as values of zero or one.

When a Control object is created, it possesses no connections to other objects, but has both an "input value" and an "output value". When given a channel assignment, it gets its input value from a device driver. The value may be inverted, and limited in range. The finalized value is called the "control output value". Additionally, a "control neutral value" can be defined.

A Control is not connected directly to an Actuator. A Control may drive an Expression though, and an Expression may drive one or more actuators. One Control may drive any number of Expressions.

When an Expression object is first created, it contains no connections to other objects, but does have a value called the "expression value". One, and only one, Control is connected to an expression to "drive" it. The Expression then takes the value of its driving control as the expression value. The Expression value is identical to the driving control value, but can be manipulated independently of the Control value from which it is derived, namely the expression value can be "overridden" by mouse movement.

When An Actuator object is created it possesses no connections to other objects, but has both an "input value" and an "output value". If an actuator is brought into one or more Expressions, the Actuator takes a new actuator input value: the value derived by its driving Expressions. The actuator input value can be manipulated independently of the value from which it is derived, namely—the input value can be "overridden" by mouse movement. Additional parameters are associated with the actuator object, namely: velocity, acceleration, output channel, minimum and maximum limits, "neutral value", and nonlinear output scaling can be defined.

An Expression can contain one, or many, Actuators. For each individual Actuator in an Expression, the Expression's contribution to that Actuator's value is defined. An "actuator curve" is described by specifying actuator values at Poses. The user first creates Poses within the Expression input range, then specifies an actuator value at each pose. The PCS generates a smooth curve of actuator values between Poses.

A single Actuator may belong to more than one expression. When this is the case, the PCS mixer takes each Expression's contribution to the Actuator's value and resolves all contributions down to a "final actuator value". This is the value sent out via the "Link" to the puppet. All Expressions have equal priority in affecting an Actuator's value.

In block 302, character representation information is created and stored. Block 302 may involve creating and storing a character document 110 using performance control system 103B. In block 304, performer movement information is received from a manual input device. Block 304 may involve receiving transduced and converted signals from a mechanical assembly with which a puppeteer performs a character.

In block 306, character motion information is created based on live performer movement information, pre-recorded performer movement information, and the character representation information. Block 306 may involve pre-processing the performer movement information and character representation information to result in creating and communicating one or more motion values to the character. In a specific embodiment, signals from transducers 104 are interpreted based on information in a character document 110 to result in generating position values for Position packets.

In block 308, the character motion information is digitally communicated to a display computer. For example, block 308 may involve transmitting Position packets to viewer 108. In block 310, based on the character motion information, a computer graphic character is displayed in a manner that is substantially synchronized to live manipulations of a performer. Thus, block 310 involves displaying a 3D or 2D animated CG character that moves in proportion to and in synchronicity with the movements of the input devices that occur in block 304.

Figure 3B:
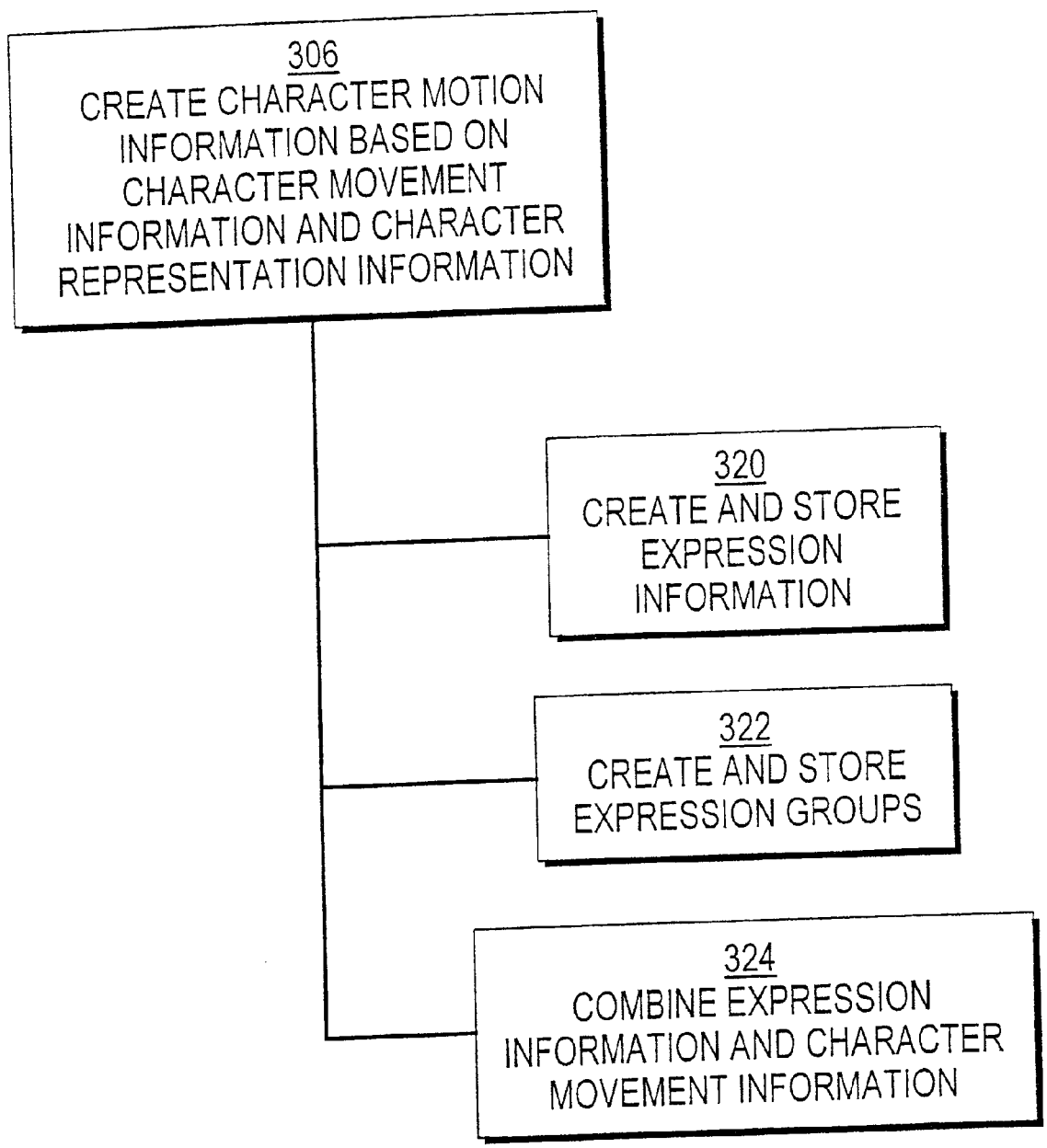
FIG. 3B is a flow diagram of other steps in the method of FIG. 3A.

FIG. 3B is a flow diagram of other steps in the method of FIG. 3A. As shown in FIG. 3B, block 306 may involve numerous substeps. In block 320, expression information is created and stored. Block 320 may involve using PCS 103B to create and store Expressions on computer 103. In block 322, expression groups are created and stored. An expression group is an association of a plurality of expressions that are coordinated in some way. As indicated by block 324, expression information and performer movement information may be combined. A mixing hierarchy is information that indicates how much influence a particular actuator is given to result in a particular expression.

Figure 3C:
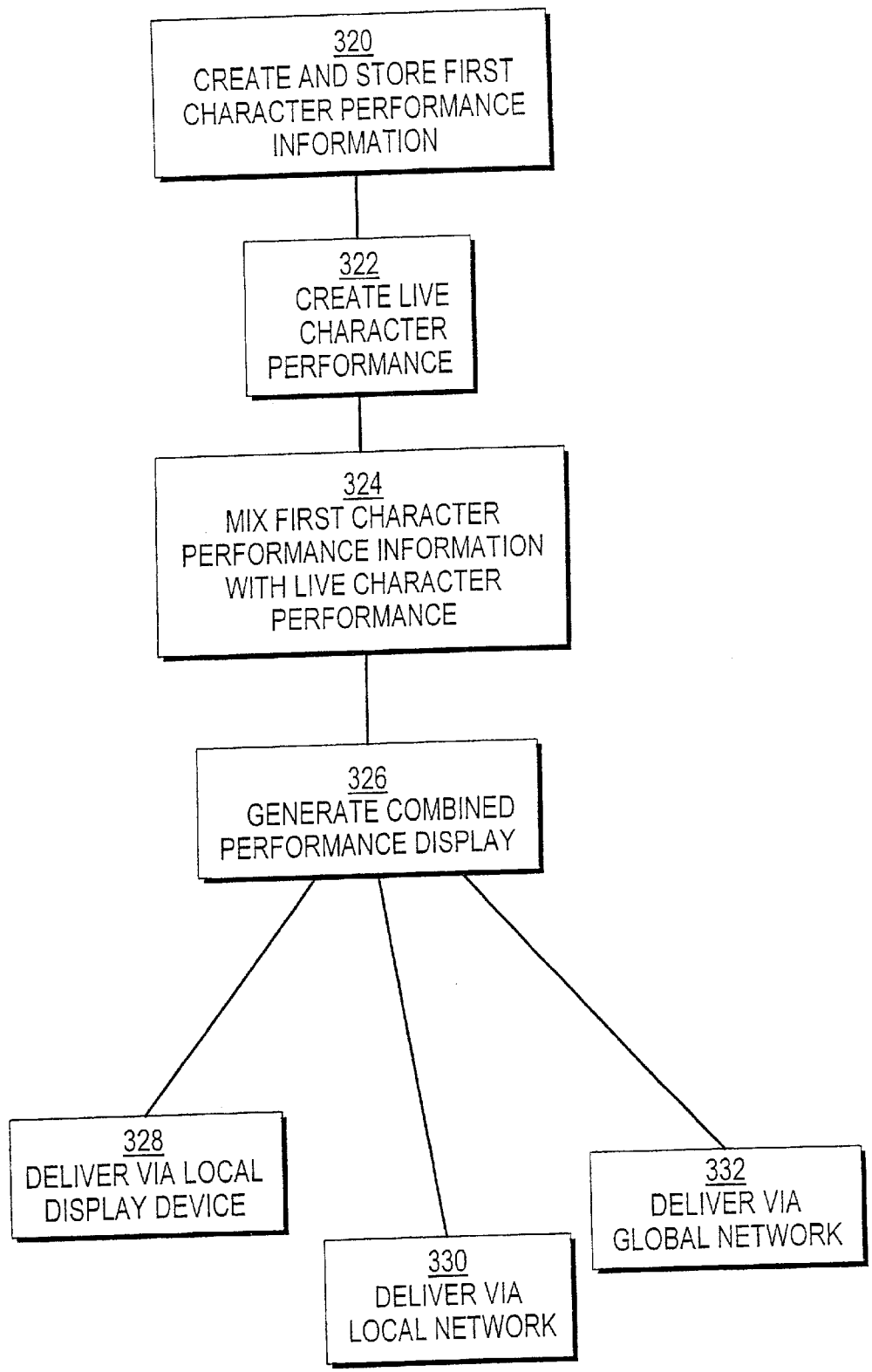
FIG. 3C is a flow diagram of further steps in the method of FIG. 3A.

FIG. 3C is a flow diagram of further steps in the method of FIG. 3A, focusing on delivering a live performance of a character in coordination with a pre-recorded character performance, and alternate methods of delivering a performance. In block 320, a first performance of a first character is created and stored. In block 322, a live character performance is created. Block 322 may involve using PCS 103B to create information that defines movement of a character during a second performance by performer 102 of transducers 104. The second performance normally involves a different character than the first performance. In block 326, a combined performance display is generated, for example, at a remote display. Computer 103 can concurrently send multiple Position values for multiple characters to viewer 108, which concurrently renders the multiple characters.

The resulting combination of a recorded character performance and a live character performance may be delivered to a local display device, such as a video display unit of viewer 108, or to a local area network, or to a global network, as indicated by block 328, block 330, block 332, respectively. Streaming performance data may be delivered to computer graphic character models that reside on remote client machines. When a performance is delivered to a global network, delivery may involve creating and storing one or more electronic documents on a server that is associated with viewer 108 or accessible using network 106. Client computer that are coupled to network 106, locally or remotely, can retrieve and display the video streams and HTML documents and thereby obtain a local view of a remote performance. Known "webcasting" technology may be used to accomplish this.

A displayed character may be recorded or stored in a motion picture medium such as film or videotape. A computer graphic character useful in a video game, Web site, etc. may be created by storing information that defines the character based on the display described above or based on the character motion information.

Graphical User Interface

Figure 4A:
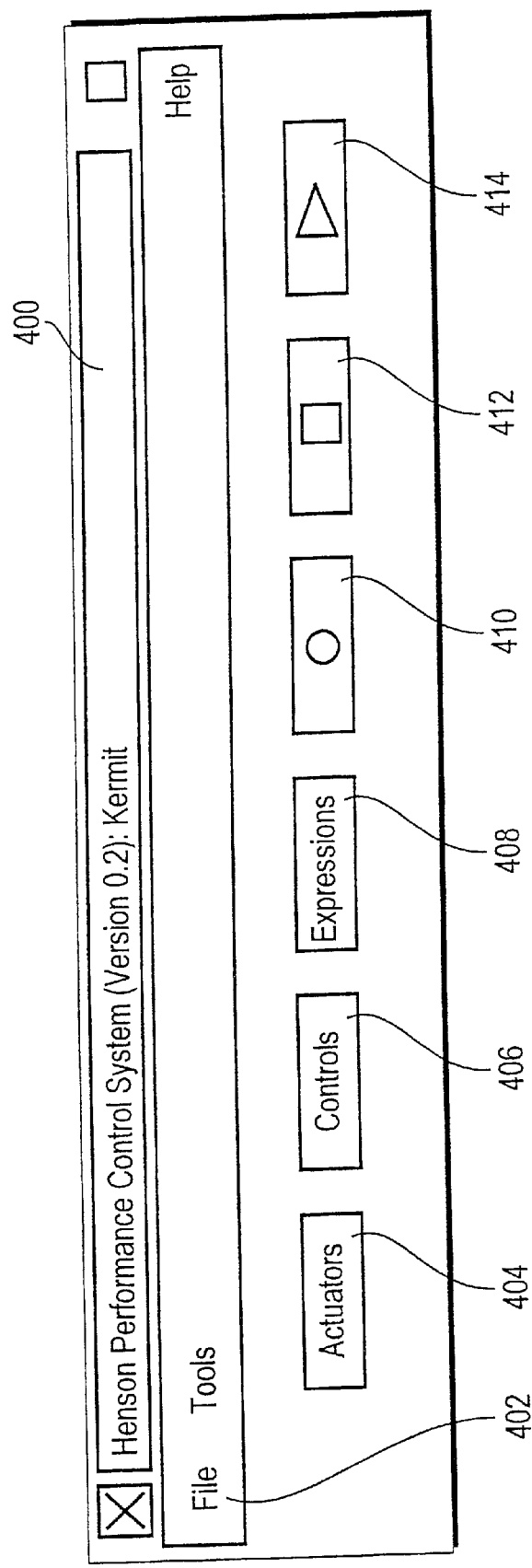
FIG. 4A is a diagram of a screen display that is generated by graphical user interface when a performance control system is in operation.

FIG. 4A is a diagram of a screen display that is generated by graphical user interface 144 when PCS 103B is in operation. Screen display 400 includes one or more pull-down menus 402, an Actuators button 404, Controls button 406, Expressions button 408, Stop button 410, Record button 412, and Play button 414. A title bar of the screen display shows the name of the current character document.

Pull-down menus 402 are structured in conventional GUI format. For example, a File pull-down menu includes a plurality of commands that enable a user to manipulate character documents 110, and terminate operation. In the preferred embodiment, File commands that manipulate character documents include New, Open, Save, and Save As. The New command clears the current character document so that a user can start a new one from scratch. The Open command opens an existing character document. It prompts the user for the name of the character document to open. Since character documents are stored and managed by Tool Server 140, they are saved on the computer that runs Tool Server 140, e.g., computer 103, which may be a different computer than that which is running graphical user interface 144.

The Save command saves the current character document. If the character document is untitled, the command prompts the user to enter a name; otherwise, the current name is used. The character document is saved on the host of the Tool Server 140. The Save As command saves the current character document using a different file name.

The Quit command causes the graphical user interface 144 to exit, however, Tool Server 140 will continue to run and serve other GUI clients.

Stop button 410, Record button 412, and Play button 414 may be used to stop playback, record, and play back a performance of a character.

The graphical user interface may have a message window that delivers status messages from processes of PCS 103B, providing more detailed technical information about the internal operation of the processes.

Character Document

Figure 2:
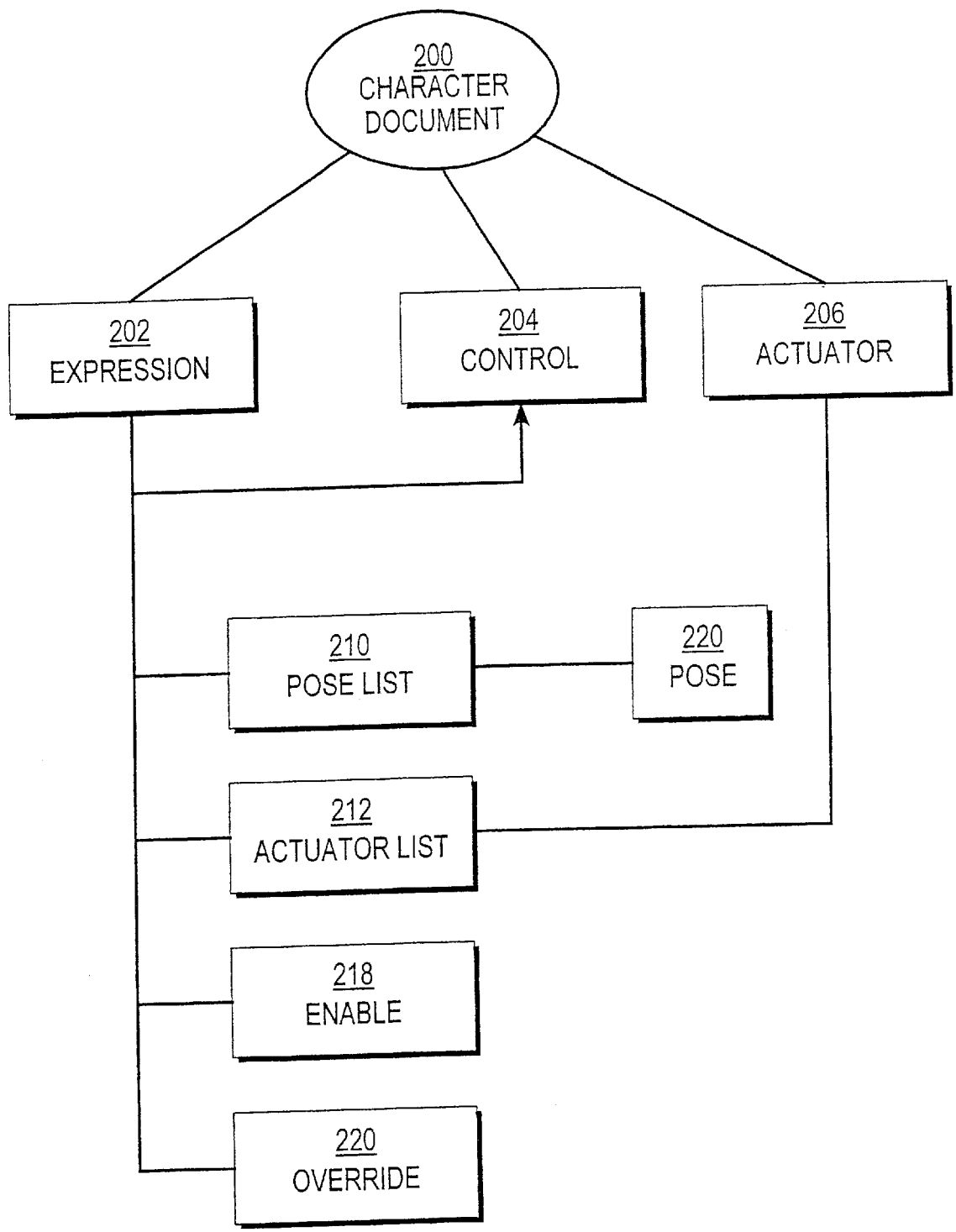
FIG. 2 is a block diagram of a character document and its constituent elements.

The use and operation of Actuators button 404, Controls button 406, Expressions button 408 are best understood in connection with an explanation of character documents 110. FIG. 2 is a block diagram of a character document and its constituent elements. A character document 200 as illustrated in FIG. 2 corresponds to one of the character documents 110 of FIG. 1A, FIG. 1B. Each element of FIG. 2 is a data structure or data value that may be set, retrieved, managed and manipulated by performance control system 103B. Generally, each character document 200 comprises one or more expressions 202, one or more controls 204, and one or more actuators 206. A simple character document might have one control, one expression, and two (2) actuators. A character document may also reference external elements such as soundtrack files.

Each expression 202 comprises a pose list 210, an actuator list 212, an Enable value 218, and an Override flag 220. Pose list 210 may comprise one or more poses 220, or may be null. Actuator list 212 comprises one or more references to Actuators 206. A pose specifies a target actuator value for each actuator in an expression. Mixing of actuator values is additive (associative), except that for a single actuator in two expressions any two expressions which share a nuance use proportional mixing.

In one embodiment, input channels of performer motion information are not automatically associated with a communications channel on the link. Controls may drive expressions, expressions may contain actuators, and actuators contain link channel assignments. As a result, a physical actuator (e.g., one of the transducers 104) becomes associated with an input channel of converter 105, and therefore with a communications channel of the link from computer 103 to viewer 108. In a preferred embodiment, PCS 103B supports up to 96 output channels in the link from computer 103 to viewer 108 or to an electromechanically actuated puppet.

Each actuator 206 is information that associates an expression with one or more real elements that cause an electromechanically actuated puppet character or CG character to actually move. When an electromechanically actuated puppet character is used, a physical actuator is an electromechanical, hydraulic, or pneumatic servo incorporating closed-loop feedback. When the system is used with CG characters displayed by viewer 108, an actuator 206 is associated with a virtual actuator that has been created and stored using 3D graphics software 108B. A virtual actuator effects a rotation of CG bones which, in turn, cause deformations of a skin mesh.

Controls

Figure 4B:
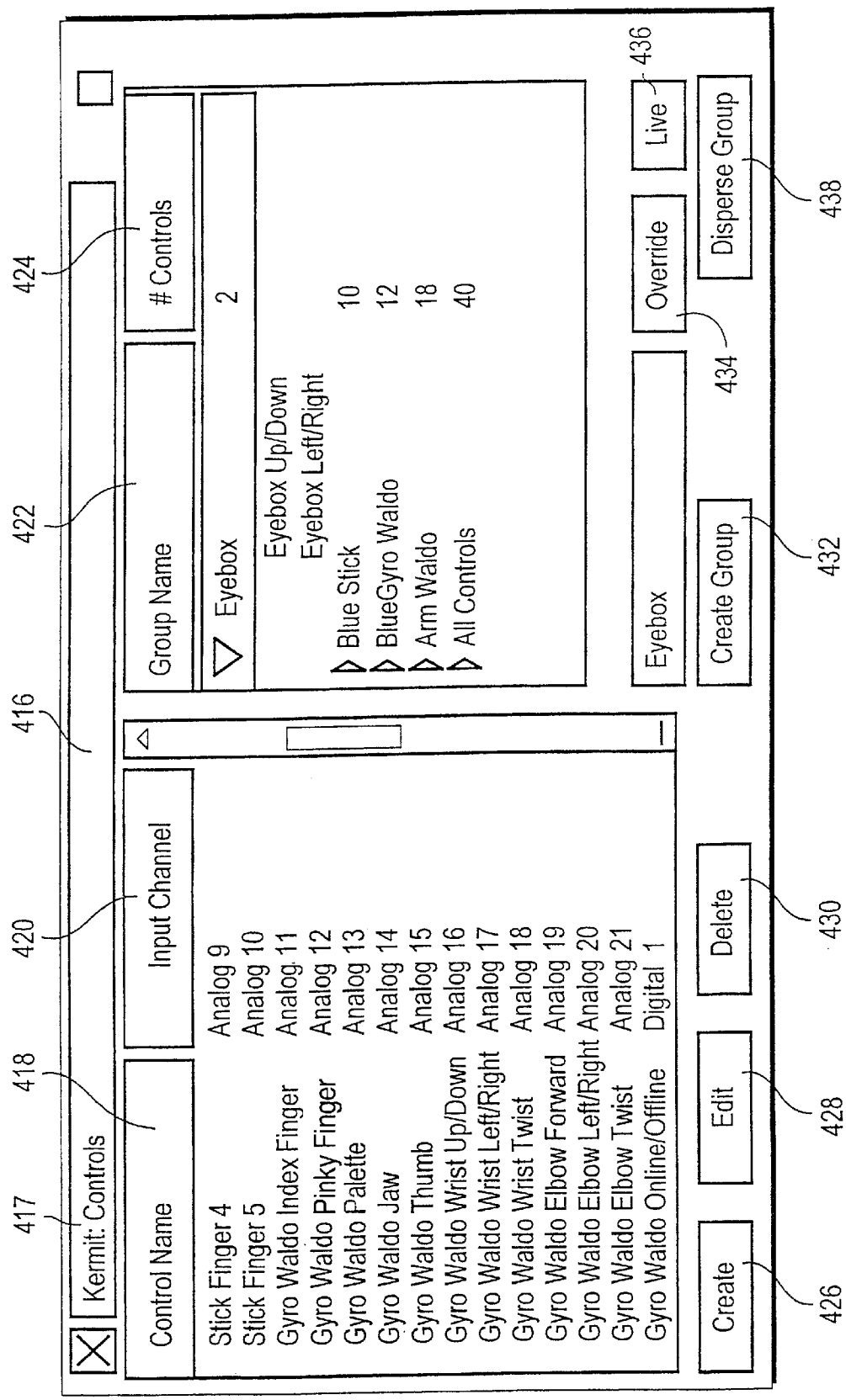
FIG. 4B is a diagram of a screen display that is generated by the performance control system when a Controls button is selected.
Figure 46:
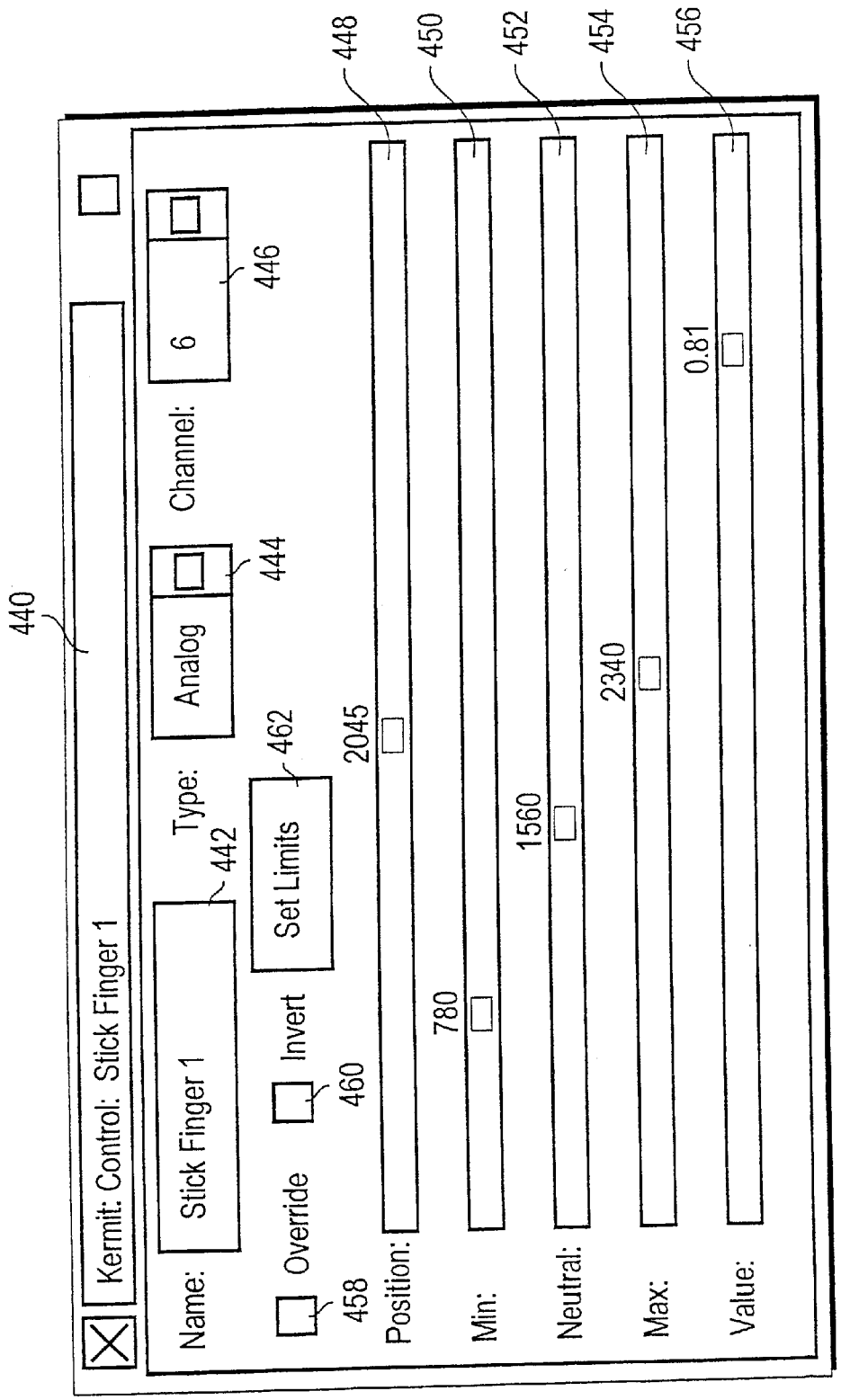

FIG. 4B is a diagram of a screen display 416 that is generated by PCS 103B when the Controls button 406 is selected from screen display 400. Title bar 417 of screen display 416 indicates that the screen display is showing currently defined controls for a character labeled Kermit. The label Kermit also uniquely identifies one of the character documents 110.

The left side of screen display 416 shows associations of control names 418 to multiplexer input channels 420. For example, a control named "Stick Finger 4" is associated with analog channel 9. Based on this information, PCS 103B will interpret any information arriving from converter 105 on analog channel 6 as indicating movement of the Stick Finger 1 control. "Stick Finger 1" represents a mechanical element of a stick control, which is one of the mechanical assemblies among transducers 104. A Create button 426, Edit button 428, and Delete button 430 may be used to create, edit, and delete associations of control names to input channels. When Create button 426 is selected, GUI 144 sends a message to Tool Server 140 instructing it to create a new control. In response, Tool Server 140 creates a new control with default values, and notifies all GUI clients on network 106 about the new control. When Delete button 430 is selected, GUI 144 sends a message to Tool Server 140 instructing it to delete the current control. Tool Server 140 will delete the control and notify all GUI clients of the deletion. Any Control window (e.g., FIG. 4C) on any client that is currently editing the deleted control will automatically close.

The right side of screen display 416 comprises a group names column 422 and control number column 424. The group names column 422 lists the names of currently defined groups of controls, and the group number column 424 specifies the number of controls that are currently assigned to a group having each name. For example, the group Eyebox has two controls, namely, the Eyebox Up/Down control and the Eyebox Left/Right control. Successively selecting an icon displayed adjacent to a group name causes the display of the controls within a group to expand and collapse. The group Eyebox is shown expanded. The group Blue Stick is shown collapsed.

A Create Group button 432 may be used to create a new group. In response, PCS 103B creates a new group with a default name, displays the default name in the list of group names, and waits. To add controls to the group, the user drags a control name to the group and drops it there. To disassociate controls from a group, i.e., to effectively delete the group definition but not the controls in the group, a user may select the Disperse Group button 438. When selected, the Override button 434 causes each control in the group to go into override mode, which causes the control position to stay at a constant value, ignoring performer motion information from the input channel. A pointing device is then the only way to move the individual controls. Selecting the Live button 436 removes the override condition so that control positions are derived from input channel performer motion information.

FIG. 4C is a diagram of a screen display 440 that is generated when a control is created or edited. The specific example shown in FIG. 4C is displayed when a user selects the Stick Finger 1 control from control names 418 and then selects the Edit button 428. In response, current settings of the Stick Finger 1 control are displayed in screen display 440. A Name field 442 displays the name of the control. A Type field 444 displays the type of the control, e.g., Analog or Digital. A Channel field 446 displays the current channel number of input converter 105 to which the control is assigned.

When preparing an electromechanically actuated puppet or CG character for use with PCS 103B, a technician will determine the allowable range of physical movement and the neutral position of each actuator, so that a full range of actuator values may be used to move actuators through their full allowable ranges. Other parameters may also be set for each actuator depending on its type. Preventing an actuator from moving outside an allowable range is one form of failsafe that is used primarily to avoid accidental damage to an electromechanically actuated puppet. Such values may be created and stored using PCS 103B, and in an embodiment that uses an electromechanically actuated puppet having a ROC, the ROC will enforce failsafe restrictions, e.g., by rejecting any illegal actuator value that is inadvertently received from PCS 103B.

A Position slider 448 graphically and numerically displays the actual current position of the control. As the position transducer 104 is moved by performer 102, the value displayed in Position slider 448 is updated in real time. A Minimum slider 450 and a Maximum slider 454 display the minimum allowed position value and maximum allowed position value, respectively, for the current control. Thus, the difference between the values of Minimum slider 450 and Maximum slider 454 represent the range of values that the current control may assume, providing a way to scale the actual motion of a mechanical element into a particular range of values. A Neutral slider 452 specifies what value PCS 103B should use as the default expression neutral value when a control is attached to an expression. The value of the Neutral slider 452 must fall within the Minimum and Maximum values. The values of the Minimum slider 450, Maximum slider 454, and Neutral slider 452 are static unless changed by a user of PCS 103B using screen display 440, and preferably have allowed values in the range of 0 to 4095.

A Value slider 456 indicates a scaled internal value representing the current position of the actuator associated with the current control and used by PCS 103B in processing character motion. The value depicted in association with the Value slider 456 falls in the range 0 to 1 and generally represents the quotient of the Position value divided by the Maximum value. Thus, in the specific example of FIG. 4C, the value 0.81 (of Value slider 456) is equal to the quotient of 2045 (Position slider 448 value) divided by 2340 (Maximum slider 454 value). The value of the Position slider may not go outside the bounds of the Minimum and Maximum sliders. The Value slider moves between 0 and 1 as the control position moves between its limits, defined by the Minimum and Maximum.

The sliders may be moved by a mouse or other input device of computer 103. When the sliders are moved, the operator may select a Set Limits button 462 which allows the user to move the control through its fill range, establishing the initial value as neutral, the maximum value as Maximum, and the minimum value as Minimum. These settings persist when the Set Limits button is selected a second time.

An Override check box 458, when checked, indicates that PCS 103B should ignore incoming performer movement information from converter 105. The position stays fixed in place unless moved by a pointing device. Limits are enforced when a control is being Overridden. An Invert check box 460, when checked, indicates that PCS 103B should invert the values received from the associated control. For example, when a control is inverted, data received from transducers 104 that indicates upward movement is converted to mean downward movement.

Virtual Controls are controls that are permanently overridden and controllable only with a pointing device. They can be assigned a special graphical look. When a Virtual Control is created, PCS 103B displays a palette of GUI widgets that may be used to graphically represent the virtual control, such as dials, sliders, etc., and adds the new Virtual Control to a virtual control window.

Actuators

Figure 4D:
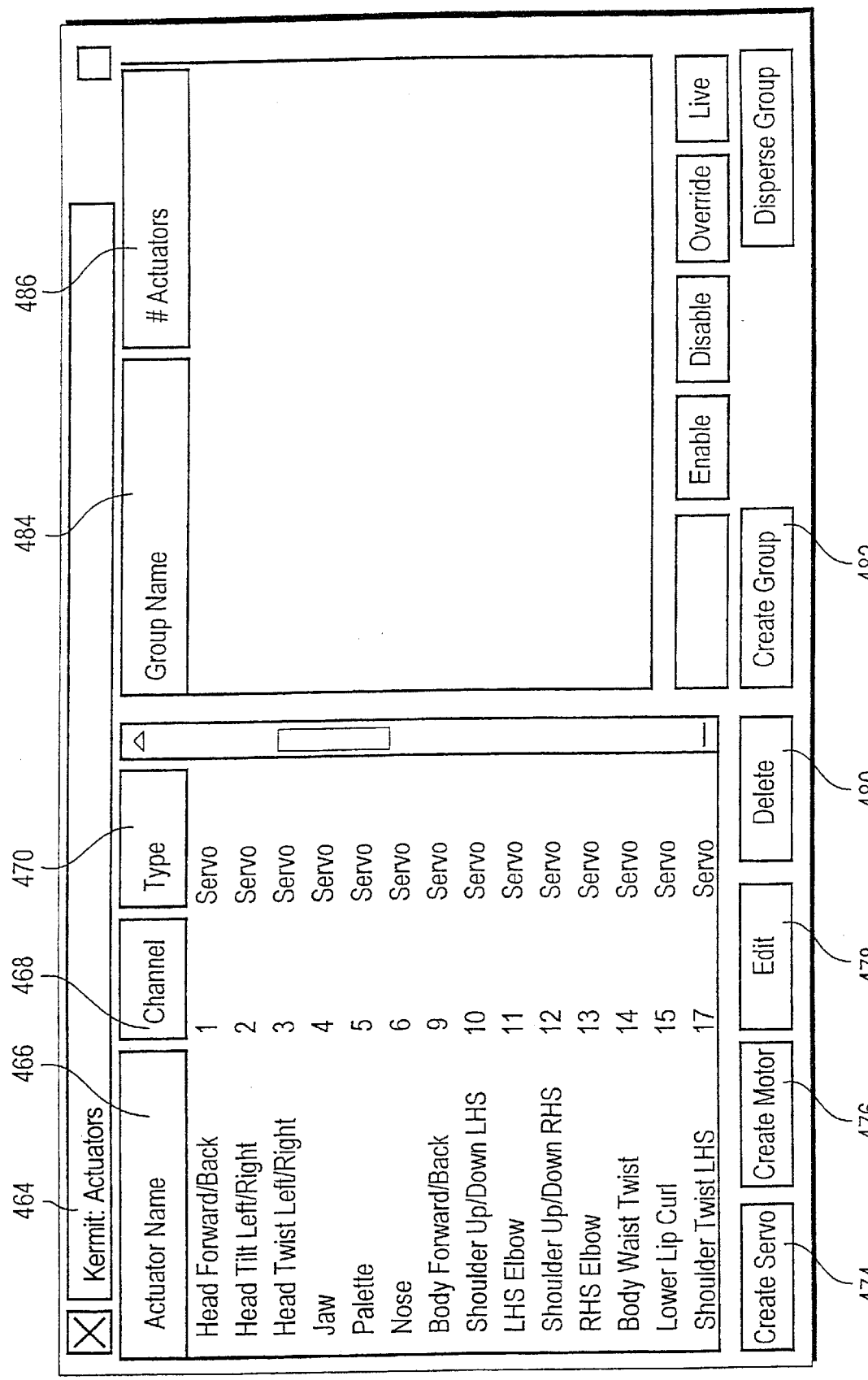
FIG. 4D is a diagram of a screen display that is displayed when an Actuators button is selected.

FIG. 4D is a diagram of a screen display 464 that is displayed by PCS 103B on a display of computer 103 when Actuators button 404 is selected. A left side of screen display 464, as seen in FIG. 4D, associates actuator names 466, communication channels 468, and actuator types 470. The information that is created using screen display 464 is stored in Actuators 206, and enables PCS 103B to know what virtual actuators have been established at viewer 108 using graphics software 108B and to associate them with data communication channels. A Create Servo button 474, Create Motor button 476, Edit button 478, and Delete button 480 enable a user to create information representing servos and motors, edit, and delete entries from among Actuators 206. Creating information representing servos and motors involves receiving user input for values of motor and servo parameters.

When a servo or motor is created, a message is sent from graphical user interface 144 to Tool Server 140, which creates a new actuator with default values, and notifies all GUI clients on the network about the new actuator. Creating an actuator adds the new actuator to the Actuator List 212 of the current character document. Delete button 480 causes graphical user interface 144 to send a message to Tool Server 140 requesting it to delete the actuator. In response, Tool Server 140 will notify all other GUI clients of the deletion. Any actuator detail windows, e.g., FIG. 5A, on any client that is currently editing the deleted actuator will automatically close.

Multiple actuators may be associated in named actuator groups. An actuator group may be created by selecting a Create Group button 482 and specifying the actuator group name and which actuators are in the group. In response, PCS 103B will display actuator group names as indicated by Group Name column 484 and the number of actuators in each group as indicated by Actuator Number column 486.

An actuator tie provides a mechanism of joining the effects of two or more actuators. When actuators are tied, all actuators in the tied groups are disabled or overridden together, and it becomes impossible to enable, disable, override, or un-override an actuator in the group individually. In an embodiment that controls an electromechanically actuated puppet character, use of an actuator tie results in two or more servo motors operating at the same time. For example, an electromechanically actuated puppet may have left and right jaw servos that need to operate in coordination in order to produce realistic movement of the creature's jaw. A user may create an actuator group, place both jaw actuators in the group, and tie the actuators in the group together. As a result, values changed for one actuator are automatically propagated to other actuators in the group.

Figure 5A:
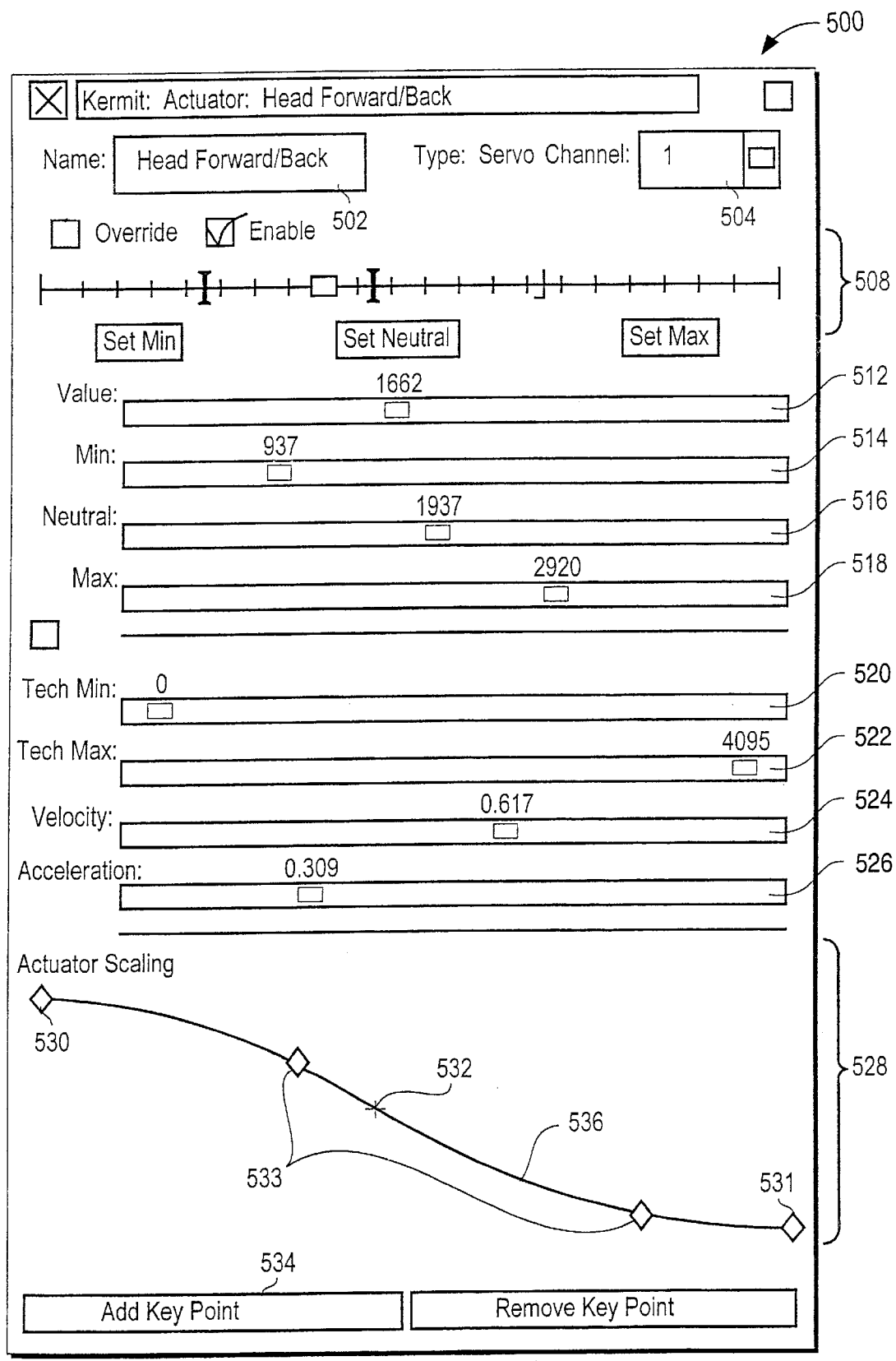
FIG. 5A is a diagram of a screen display generated when a user edits a particular actuator.

FIG. 5A is a diagram of a screen display generated by PCS 103B when a user selects a particular actuator in screen display 464 of FIG. 4D and then selects Edit button 478. Screen display 500 shows parameter values associated with the selected actuator. The name of the selected actuator is displayed in a Name field 502. The Type of the selected actuator is displayed adjacent to the Name value, and the Channel to which the selected actuator is currently assigned is displayed in a Channel field 504. The Channel field 504 may be structured as a scrollable fields so that the value may be adjusted by selecting associated arrows or other GUI widgets. As changes are made to any field of screen display 464, Tool Server 140 notifies all GUI clients of the change. As a result, any change made will be displayed on any other GUI client.

Screen display 500 also may include a position indicator 508 structured as an icon (depicted as a square in FIG. 5A) that moves along an axis marked with minimum, neutral, and maximum points. A larger pair of brackets represent physical limits of movement set by a performer using sliders described below. The smaller pair of brackets and the neutral position may be adjusted by a performer using sliders as also described below. The position indicator 508 is updated in real time as an actual actuator of an electromechanically actuated puppet or a virtual actuator of a CG character moves in response to a performance by performer 102. The graphical appearance and location of position indicator 508 is based on values indicated by a Value slider 512, Minimum slider 514, Neutral slider 516, and Maximum slider 518, which operate in a manner analogous to the sliders shown in FIG. 4C and described above, with respect to the current actuator.

Screen display 500 has a Technician Minimum slider 520 that indicates the minimum value that the performer's minimum can assume. Technician Maximum slider 522 indicates the value that the performer's maximum may assume. In an embodiment that uses a ROC in an electromechanically actuated puppet, the Technician Minimum and Technician Maximum values are sent to the ROC over link 107 and used to set minimum and maximum movement values. Thereafter, the ROC enforces the movement limits by refusing to move actuators to illegal position values that are outside the limits. Thus, the Technician Minimum and Maximum sliders enable a technician to set actuators in an electromechanically actuated puppet to a safe range of movement, ensuring that puppeteers may move the electromechanically actuated puppet only in a safe range. This protects the electromechanically actuated puppet from damage.

A Velocity slider 524 indicates a value, in the range of 0 to 1, representing how fast the current actuator should move between a first position and a second position when an associated control mechanism changes. Thus, when a Velocity value is low, even a rapid change of one of the transducers 104 will result in a slow rate of change of the associated physical or virtual actuator of the electromechanically actuated puppet or CG character. Similarly, an Acceleration slider 526 indicates how rapidly the rate of change of an associated physical or virtual actuator should increase. A low Acceleration value produces low rate of change, i.e., smooth movement of the associated actuator. A high Acceleration value produces a fast rate of change.

An Actuator Scaling pane 528 of screen display 500 is a graphical tool that permits a user to specify alternative actuator values, represented by curve 536, corresponding to raw linear actuator values 512. For curve 536, the horizontal axis represents input, and the vertical axis represents output. All possible actuator linear values 512 are on the horizontal axis, and user specified values are on the vertical axis. Thus, curve 536 represents the rescaling of an actuator as it is moved among different position values. When curve 536 is non-linear, the scaling effects a varying rate of change in velocity for a constant rate of change of the actuator value; the rate of change of the slope of the curve indicates acceleration rate. Position values sent from PCS 103B to viewer 108 will vary over time in accordance with the curve 536.

A user may make curve 536 non-linear by establishing one or more key points 533 along curve 536, by selecting the Add Key Point button 534. A cursor 532, under control of a mouse of computer 103 or a similar pointing device, is used to position a key point on curve 536 and drag the key point until the curve assumes the desired shape. When a key point is added, PCS 103B interpolates spline curves for the segments of curve 536 that interconnect the key point and other key points between starting point 530 and ending point 531. The spline interpolation is carried out in real time as the key point is dragged, and curve 536 is refreshed in real time to show the updated curve shape. Releasing the mouse button causes the curve to be stored in persistent manner.

By creating and storing a curve 536 for one or more actuators, realistic creature movement can be achieved. Such effects as the weight of a limb or an object grasped by a character may be reflected in the movement of electromechanically actuated puppet arms or CG character arms. Eyelids may vary speed when moving between opening and closing rather than moving in linear, mechanical fashion. Nonlinear scaling also may be used to reverse the direction of an actuator.

Expressions

Figure 5B:
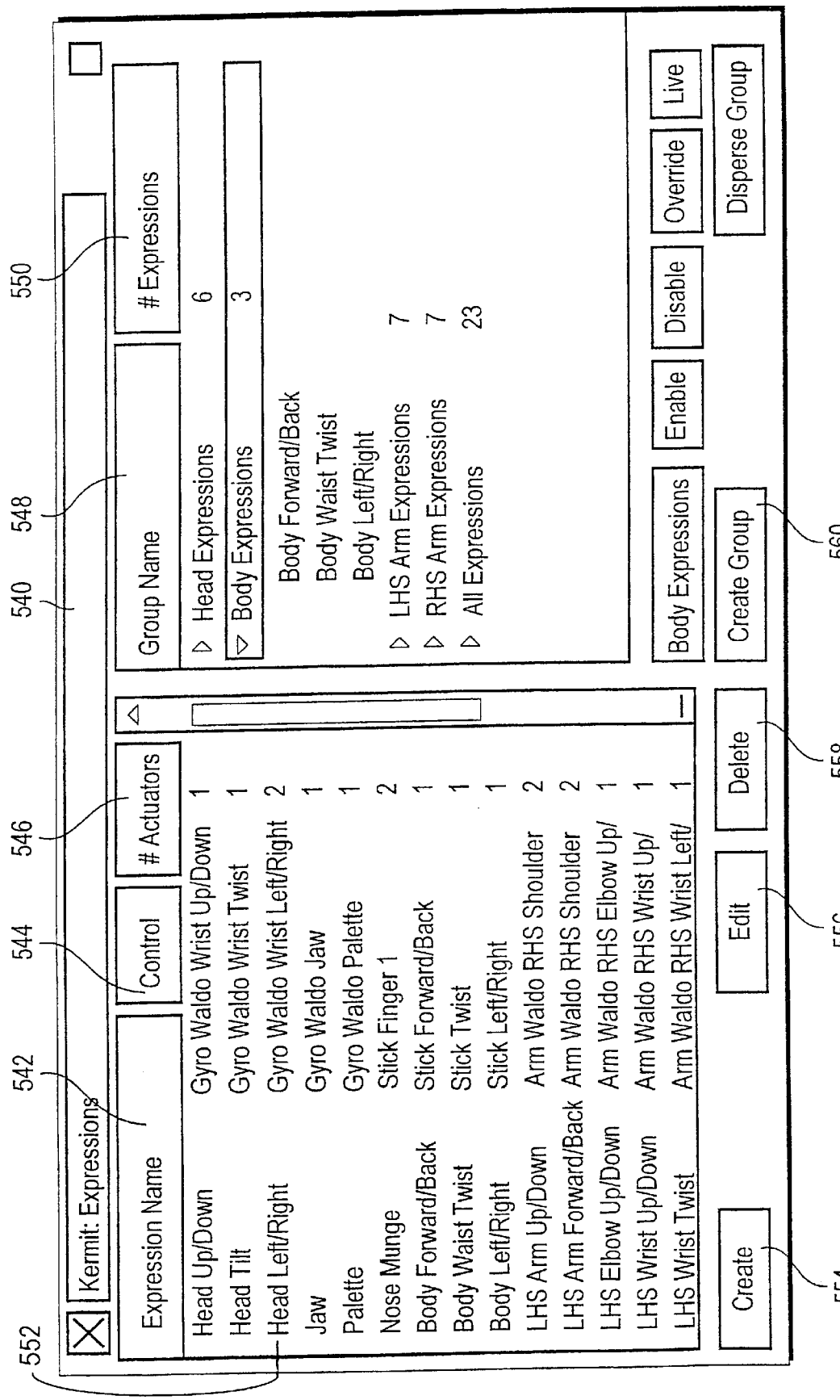
FIG. 5B is a diagram of a screen display generated when an Expressions button is selected.

FIG. 5B is a diagram of a screen display 540 that PCS 103B generates when Expressions button 408 is selected. FIG. 5B shows example expressions defined for a character labeled Kermit. An Expression Name column 542 lists each expression by name. Each expression named in Expression Name column 542 is associated with one of the expressions 202 of a character document 110, 200. For each named expression, a Control column 544 identifies a control from among transducers 104 that will cause the named expression to occur when that control is manipulated. For example, the Head Left/Right expression 552 is triggered when the Gyro Waldo Wrist Left/Right transducer moves. An Actuators column 546 indicates the number of actuators that are associated with the current expression.

Thus, expressions tie controls to actuators. Movement of a joystick-type physical control, like a "stick", in one direction can result in movement of one or more actuators, while movement of the joystick in an orthogonal direction can result in movement of one or more of the same, or completely different, actuators.

A Create button 554 is used to create a new expression and a Delete button 558 causes PCS 103B to delete a selected expression.

Expressions may be associated in groups for organizational purposes. Screen display 540 includes a Group Name column 548 that lists each named expression group, and an Expressions column 550 that identifies the number of expressions in each group. A new group may be created by selecting the Create Group button 560. The Enable button turns on all expressions within the expression group. The Disable button turns off all expressions within the expression group. The Override button causes the expression value 586 of each expression in the group to remain at current value; each expression then ignores its respective control value 456. Expression values then can be changed only with a pointing device. The Live button removes the Disabled state so that each expression value 586 is derived from that expression's control value 456. The Disperse Group button causes PCS 103B to disassociate the group without deleting the expressions in the group.

Parameters of the specific expression may be viewed by selecting an expression and selecting the Edit button 556. FIG. 5C is a diagram of a screen display 570 that PCS 103B generates in response to such a selection.

The name of the current selected expression is displayed in a Name field 572. The control associated with the selected expression is displayed in a Control field 574. An Override check box, when checked, causes the expression value 586 to remain at current value, ignoring its control value 456. The expression value can then be changed only with a pointing device. An Enable check box 578, when checked, indicates that the selected expression is enabled and should be used.

The Solo toggle removes all other expressions from the mixer, so that they have no effect on the actuators that they drive. Thus, a user can isolate the current expression's contribution to the puppet. The Nuance drop-down 582 menu allows the user to select a second expression containing one or more of the same actuators as the current expression. The window then shows two graphical expression bars perpendicular to one another. With two expression bars, the user then chooses a pose common to the two expressions and adjusts the actuator sliders, as previously described.

A nuance is a software object that enables a performer to specify two expressions and then define a compound pose at each of the extremes of the two expressions. In this way, the performer explicitly controls how two expressions combine. Nuancing may also be used to tune compound actuators in an electromechanically actuated puppet that could otherwise introduce performance limitations.

Each expression comprises one or more poses, as indicated by Pose 220 of Pose List 210 of FIG. 2. Each pose comprises one or more final values of that number of actuators that are associated with the expression. In FIG. 5C, each pose is graphically represented as a pose icon 585 arranged along a bar 584 representing the sweep of the expression's control. When an expression is created, it does not contain any poses. A useful expression contains at least two poses. The current position of a character as between poses is indicated by an expression value 586.

In the example of FIG. 5C, three (3) actuators are associated with the Head Left/Right expression of character Kermit. Accordingly, screen display 570 includes three panes 588A, 588B, 588C, each of which graphically illustrates the final values of one of the actuators associated with the expression. First pane 588A represents a value of the Head Twist Left/Right actuator and shows a curve defined by that actuator's pose values 590A. Second pane 588B shows similar information for the Head Tilt Left/Right actuator and third pane 588C defines values for the Body Forward/Back actuator. Thus, the Head Left/Right expression defines three types of concurrent movement. The character's head twists, the head tilts, and the body moves forward or back. Actuator final values may be adjusted by moving the sliders. As adjustments are made, in real time, PCS 103B causes the actuators of an electromechanically actuated puppet or the virtual actuators of a CG character displayed by viewer 108 to move.

Actuator pose values may be adjusted by moving the sliders when a pose is selected. In response, PCS 103B displays the final values and curves associated with the same three (3) actuators, for the selected pose. In this way, complex expressions involving concurrent movement of multiple actuators may be defined, resulting in highly realistic movement of the associated electromechanically actuated puppet or CG character.

Other actuators may be added to a pose or expression by selecting the Add Actuator pull-down menu 596 and choosing the appropriate actuator. Conversely, an actuator may be removed from a pose by selecting the Remove Actuator button 598. If the operator finds the actuator curves 592A, 592B, 592C unnecessary or distracting, selecting the Show actuator curves check box 597 will cause PCS 103B to remove the actuator curves from the display.

Groups

As described above, a user may create a group of objects, such as actuator groups, control groups and expression groups, and manipulate all the objects in the group at once with single commands. Using the mechanisms described above, groups can be created and given a name. Groups can be deleted, however, deleting a group does not delete the objects in the group, it merely disassociates them. Single level grouping is believed to be adequate for the purposes of this system, however, in an alternate embodiment, multiple level (nested) grouping could be provided.

For actuator and expression groups, the same object can be in more than one group. Actuator groups can be disabled, enabled, overridden, or tied. Control groups can be overridden and made live. Expression groups can be enabled, disabled, overridden, and soloed. Performing a job on a group means that the job is performed to each individual member of the group.

Synthetic Control

PCS 103B may provide synthetic movement of a control. In synthetic control, PCS 103B automatically synthesizes or randomly generates a position signal for a particular actuator that produces a particular effect. For example, synthetic control may be used to create an eyelid blink. As another example, a signal that ramps up and down in amplitude may be generated to simulate a breathing cycle of a character. Synthetic control may be implemented by assigning a control to an input channel whose movement is automatically generated. Such controls then can be made to drive expressions.

User Roles

Preferably, PCS 103B supports two user modes having different levels of permissions and access rights. For example, PCS 103B has a Puppeteer Mode and a Technician Mode. When the graphical user interface of the system is switched to Technician Mode, a user may manipulate certain graphical widgets that cannot be manipulated in Puppeteer Mode. Examples include technician limits, actuator disabling, actuator tying, etc. Technicians are able to carry out functions that may result in damage to an electromechanically actuated puppet. Each role is associated with a different background color in graphical user interface 144.

Notification of Object Creation in Shared Memory

Shared data of character document objects such as controls, actuators, and expressions is stored in shared memory to provide fast access to Motion Engine 142 and Tool Server 140. Tool Server 140 uses a lightweight message protocol to notify other processes that shared objects have changed. Each message specifies whether an object is being created or deleted, its type, and the location in shared memory of the object's shared data.

In an embodiment, a Message class contains the message. A Transport class encapsulates a message pipe and reads and writes messages with them. A Messenger class contains application-specific functions to encode and decode a message and send or receive it using the Transport class.

For example, when a new actuator is created, Tool Server 140 updates the Actuator List 212 of the current character document. Tool Server 140 also allocates most data for the new actuator in shared memory. The Actuator List 212 notifies the Messenger about the newly created actuator. The Messenger constructs a Message object and sends it using the Transport object. In the Motion Engine 142, the Messenger object reads the Message from the Transport and decodes it. Motion Engine 142 will then determine that it should create a new actuator, and notifies its actuator list, which creates an actuator in the Motion Engine 142 process. This actuator sets its internal pointer to the location of the already existing data in shared memory.

When an expression needs to call a method of one of its actuators, it goes through the actuator list to get the local pointer based on the actuator identifier.

Part of a PCS object may reside in shared memory, however, in the preferred embodiment, the Tool Server and Motion Engine both store private copies of the rest of the object. Such an object is referenced by an identifier in interprocess communications, and in meta-objects that contain it. Referencing such an object by identifier enables the Tool Server and Motion Engine to find the shared part of the object in a shared memory lookup table.

Protocol for Communication of GUI and Tool Server

A lightweight, pre-defined protocol is used to communicate information between graphical user interface 144 and Tool Server 140. Each message in the protocol comprises a Message size value, a Client ID value, a Serial number value, a Command value, a Class value, an Object ID value, and object-specific data.

The Message size value is an integer that specifies the total size of the message, including the Message size value.

The Client ID value is a unique identification number that is assigned to the graphical user interface 144 client when it connects to the Tool Server 140 for the first time. Thereafter the graphical user interface 144 sets the Client ID field to that value whenever it sends a message to Tool Server 140. Responses from Tool Server 140 provide the Client ID value of the GUI client that originally requested an action by the Tool Server. This allows each GUI client to keep track of which messages they send to Tool Server 140 are acknowledged or acted on by the Tool Server.

The Serial number value is a unique numeric value that is assigned to each message sent by a GUI client. The Serial number is unique for each client. Thus, a GUI client may examine a combination of Client ID and Serial number values to determine whether an incoming message is an acknowledgement to one of its own previous outgoing messages.

The Command value specifies the nature of the message. Preferably, the Command value is: NO.COMMAND (default when a new message is created); CREATE (create a new object); DELETE (delete an existing object); UPDATE (update attribute of an existing object); CUSTOM (class specific message); QUIT (shut down Tool Server). The Class value specifies the type of object that is being created, deleted, or updated. Preferably, the Class value is: ACTUATOR; CONTROL; EXPRESSION; CLIENT_INFO. The CLIENT_INFO value is used when Tool Server 140 is providing an ID number to a GUI client.

The Object ID value uniquely identifies an object of a particular type. Each object of a particular type that is created or managed by Tool Server 140 or Motion Engine 142 has a unique Object ID value. The ID value is an index into the shared memory block for the objects of a particular type. The Object Data value is a string of any size that may carry any payload desirable for a particular class or method. For CREATE and UPDATE messages, the Object Data value contains the values of the object. For CUSTOM messages, the Object Data value contains the custom message for the class; the class is responsible for interpreting the message.

Proportional Mixing

A Mixer object in Motion Engine 142 performs mixing of object values, including additive mixing, proportional mixing, etc. The Mixer object interfaces with Control, Actuator, and Expression objects. To carry out mixing, Motion Engine 142 may also use data that is pre-processed by Tool Server 140, e.g., tables that represent actuator curves 536. Such tables and other data needed in mixing is stored in shared memory accessible by both Motion Engine 142 and Tool Server 140.

The Mixer object resolves final actuator position values by iterating through actuators, checking their memberships in expressions, resolving the final actuator value for a pair of expressions affecting the same actuator, and successively mixing previously resolved actuator values with each expression in turn.

Any second expression of a pair affects the first by shifting the actuator value a proportion towards the Intermediate Nuance Value. The Intermediate Nuance Value is the proportion off neutral toward minimum or maximum of the second expression's control. The Intermediate Nuance Value is calculated dynamically. It also represents the proportion of the control between the Pair Nuance Value and the second expression's final value.

An Expression class stores, in static data, a list of actuator memberships in one or more expressions, and a list of controls that drive one or more expressions. Referring again to FIG. 2, Expression 202 contains an Actuator List 212 and controls 204. The Expression class updates the lists when an actuator or control is added or deleted from the expression.

Successive expressions are mixed in temporal order, such that the most recently entered expression is evaluated last. The Mixer object stores and maintains a queue of expressions based on the temporal order in which they are entered. The queue is stored in the Expression class as static data. When the Mixer object determines that a control value has crossed the neutral value, the expression it drives is dequeued from the expression queue. Similarly, when a control value moves off neutral, the Mixer object calls a method of the Expression class to cause all expressions of that control to move to the head of the queue. In an embodiment, the expression temporal queue is initialized as a fixed length linked list in which each node contains a pointer to an expression.

The Mixer object inspects control values and verifies that the expression queue is current. Thereafter, the Mixer object steps through the actuators and resolves their positions the Mixer object moves from the top of the queue to the bottom, extracts the expression identifier of each node in the queue, and checks the actuator membership list based on the expression identifier. The actuator membership list is a fixed size, 2-dimensional Boolean array. Each row of the array represents an actuator and each row label is an actuator identifier value. Each column of the array represents an expression each column label is an expression identifier value. An element of the array at a location (row R, column C) is marked TRUE when actuator R is a member of expression C. If the Mixer object finds a TRUE value in an array element, mixing starts or continues using the expression's pointer.

Thus, proportional mixing proceeds according to the algorithm expressed in the following pseudocode:
for each actuator on actuator list
   reset resolving sub-values
   reset active expression queue
   loop until done:
     get an expression from queue
     if actuator is a member of current expression,
       loop to get second expression of which the actuator is a member
       if we have a second expression,
         resolve actuator sub-values by first, second expression
         consider second expression to be first
         else finalize actuator value using first expression (and sub values, if any)
       do any supplementary mixing on the actuator
       enforce any failsafes on the actuator value
       done for this actuator, no longer resolving
     else get next expression from queue.

OPERATION DURING A PERFORMANCE

In operation, data packets generated by performance control system 103B, formatted according to the ROC Protocol that is described further in this document, are received in the viewer 108 using a plug-in software element 108C that is logically coupled to 3D graphics software 108B. Depending on the specific software that is used as 3D graphics software 108B, plug-in 108C may consist of a single dynamically linked library, or a coordinated group of separate threads or processes which run alongside 3D graphics software 108B.

Figure 1E:
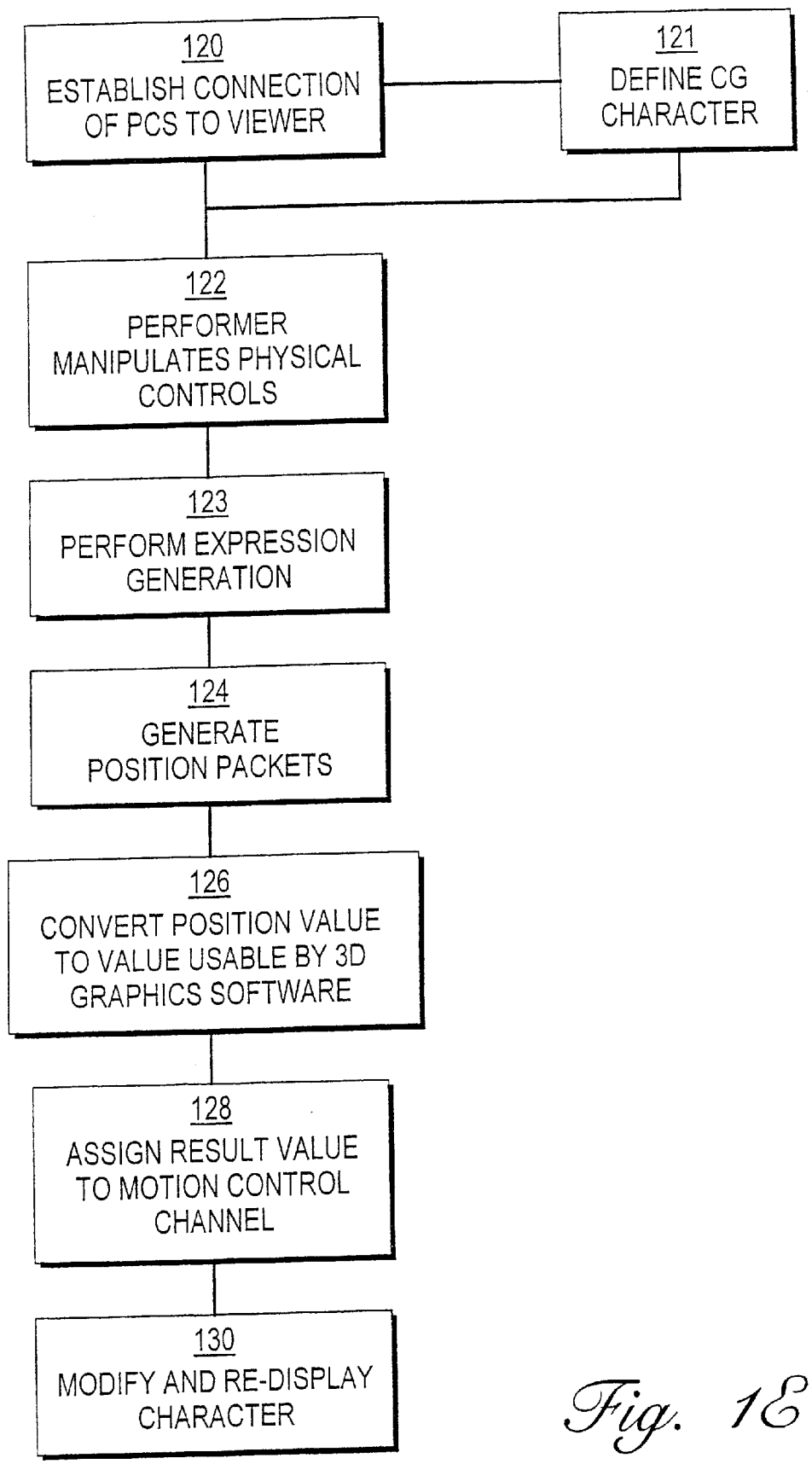
FIG. 1E is a flow diagram of an embodiment of a character performance process that may be carried out using a performance control system.

FIG. 1E is a flow diagram of an embodiment of a character performance process that may be carried out using a system as described above. For convenience, in FIG. 1E, the term "performance control system" is abbreviated as "PCS".

In block 120, a connection of the PCS to the viewer is established. For example, a ROC Protocol connection is established between plug-in 108C and performance control system 103B. In block 122, a performer manipulates a mechanical assembly. In response, position transducers associated with the mechanical assembly generate signals. In an embodiment, position transducers 104 communicate, to converter 105, analog electrical signals generally proportional to the amount of movement of the associated mechanical assembly by the puppeteer. Converter 105 converts the signals to digital signals and provides them to computer 103. Computer 103 receives the digital signals and communicates them through appropriate drivers and other software interfaces to PCS 103B. Thus, block 122 involves receiving, at a first computer, performer movement information from a manual input device that receives live manual manipulations and converts the manipulations into the performer movement information.

In block 123, the PCS performs expression generation. In expression generation, the PCS creates and stores character motion information based on combining the performer movement information with the character representation information. The character representation information may include controls, expressions, and actuators as described herein. The character motion information can be used for displaying the computer graphic character substantially synchronized to the live manual manipulations using the computer and based on the character motion information.

In block 124, the PCS generates one or more Position packets. In an embodiment, over the ROC protocol connection, performance control system 103B sends a continuous stream of Position packets. Preferably, the Position packet stream is sent at a rate that approximates real time, e.g., at a nominal rate of 60 Hz. This data has low latency on a fast network, but does not strictly comprise hard real time data, as it is neither deterministic nor is the period guaranteed to be accurate, due to networking delays. In practice, however, these tradeoffs have been found to be acceptable.

Each Position packet contains a plurality of data values that represent the final positions of actuators. Preferably, each Position packet contains integer values for each Actuator in a compressed format. One Actuator Value corresponds to one PCS actuator. One movement might be a rotation, a positional translation, or a "morph". The CG character functions as if it had mechanical actuators inside of it, as does an electromechanically actuated puppet.

Before a performance session, 3D graphics software 108B is used to create and store information defining one or more characters that may be performed by a puppeteer, as indicated by block 121. The characters that puppeteers perform are composed of a computer graphic "mesh". The character meshes may comprise polygonal meshes or "nurb" (spline curve) meshes. Typically 3D graphics software 108B will have two primary means by which to move a character. The first means is a system of software "bones" which, by virtue of a region of influence on the mesh of the character, cause "surface deformations" of the mesh. Typically, bones systems comprise hierarchical data structures that behave in a forward-kinematic fashion. Each bone has 3 rotational axes (X,Y,Z) from its root (the endpoint of the previous bone in a hierarchy). Bones may also be translated in 3-D space. One rotation corresponds to one Actuator or one of the position transducers 104. Bones and deformations are kept granular: they are "muscles" which can be combined by a puppeteer using performance control system 103B.

The second primary means of moving a character is via a morph. This is essentially two fixed mesh deformations between which the mesh can be moved proportionally. Complex morphs generated by viewer 108 are infrequent. When morphs are used, they are kept small. As with bones, they are "muscles" which can be combined into complex expressions by a puppeteer using performance control system 103B. 3D graphics software 108B may offer other means of moving meshes, such as a "lattices", "wire tools", etc., which may also be used.

Regardless of whether a character is moved with bones or morphs, it is driven by a single scalar value supplied by performance control system 103B in the Position packet that is generated at block 124. In block 126, a Position value in the Position packet is converted to a value that is usable by the 3D graphics software. For example, Plug-in 108C converts the integer value received from performance control system 103B to either a floating point value (e.g., a value in the range 0.0 to 1.0), or an angular constant. In block 128, the result value is assigned to a motion control "channel" of the 3D graphics software 108B. Block 128 may be carried out by plug-in 108C calling a function of 3D graphics software 108B that is accessible through an application programming interface (API) of the 3D graphics software. A channel drives a bone rotation or translation, or a morph. In block 130, the character is modified and redisplayed based on the value described above.

In a preferred embodiment, internal functions of plug-in 108C may be accessed by CG application 108B using the API of CG application 108B. Preferably, the API of CG application 108B provides a means of doing the following:

1. Querying 3D graphics software 108B for available motion control channels.
2. Initializing plug-in 108C.
3. Starting the motion capture device represented by the plug-in.
4. Stopping the motion capture device represented by the plug-in.
5. Querying the plug-in for current channel values.
6. Prompting the plug-in to update current channels values.

In one embodiment, Viewer 108 performs CG characters at relatively low resolution, e.g., below 4,000 polygons, in soft real time, and the CG characters are later separately rendered at high resolution to result in a Quicktime movie, or the equivalent. The performance data may also be captured for the purposes of streaming the performance data over a network, such as the Internet, to CG application software running on a client that is logically separated from the system by the network.

ROC Protocol

Figure 6:
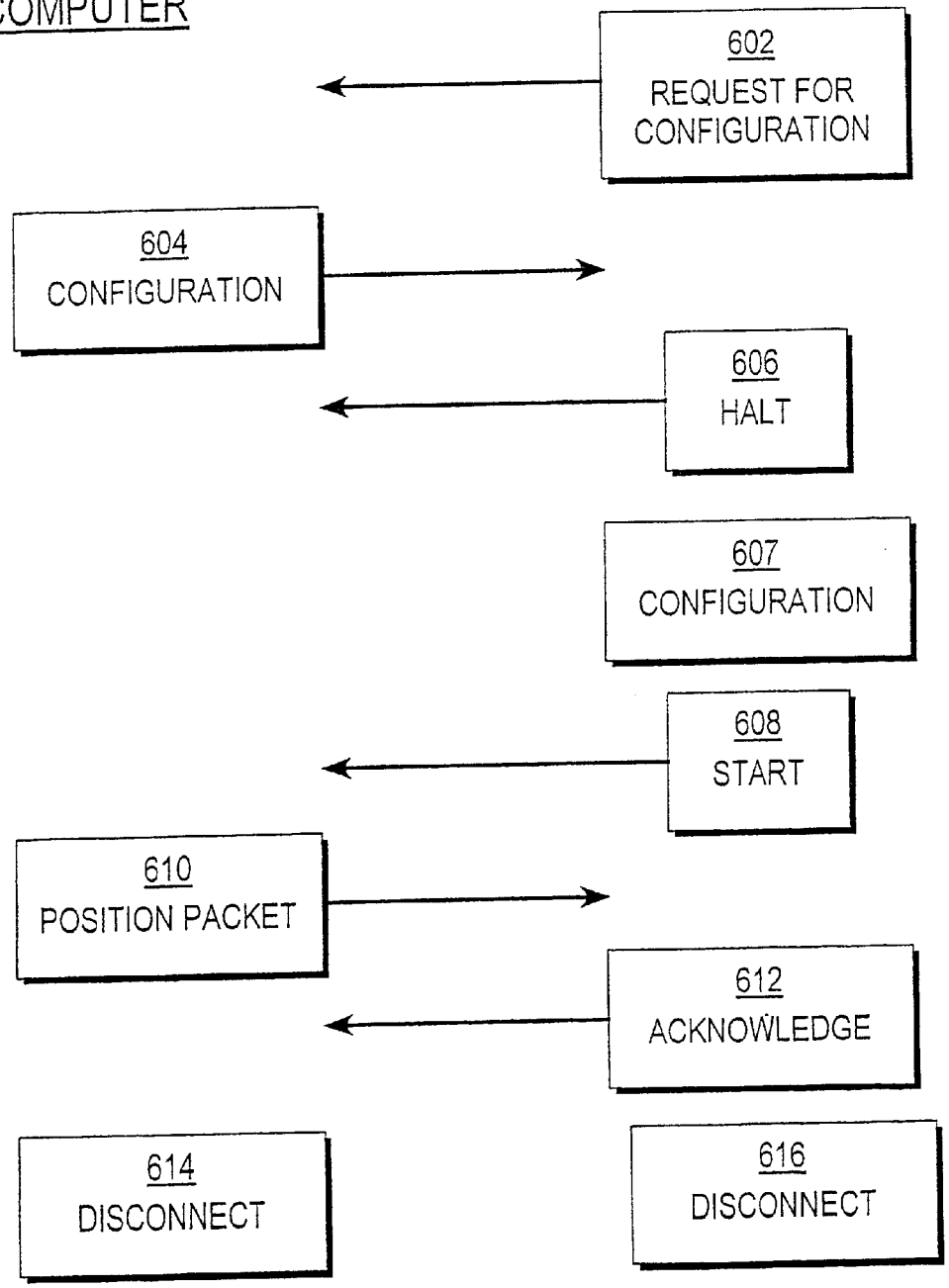
FIG. 6 is a flow diagram of a process of communicating information between a control computer and a character.

FIG. 6 is a flow diagram of a process of communicating information between a control computer, such as computer 103, and a character. In one embodiment, computer 103 communicates with a remote onboard computer ("ROC") of an electromechanically actuated puppet device. In the preferred embodiment of this document, computer 103 communicates with plug-in 108 C, which emulates a ROC. The plug-in 108C emulates three main functions of the ROC: Connection, Position Streaming, and Disconnection. Advantageously, use of a well-defined protocol enables third parties to develop other CG plug-ins and electromechanically actuated puppets that are compatible with the protocol, without burdening such parties with development of an entire control system.

For Connection, upon startup, plug-in 108C sends out Request For Configuration packets, as shown by block 602, at a pre-determined frequency, e.g., 1 Hz. Each Request For Configuration packet comprises a routing header, a byte count value, a packet identifier that indicates a request for configuration, a character document file name, and an error checking value such as a 16-bit CRC value expressed in two bytes. In these values the plug-in 108C specifies its own identifier, an identifier of the control computer with which it wants to connect (e.g., computer 103, a value of "0" indicates any control computer), and a desired character document name.

Computer 103 listens to all links of the system that use the ROC protocol. When computer 103 detects a Request For Configuration, computer 103 answers by sending a configuration packet, as shown by block 604. Each configuration packet comprises a routing header value, a byte count value, a packet identifier, a unique identifier value, a frame rate value, an analog channel count value, a binary channel count value, one or more channel type values, and an error check value.

The byte count value indicates the size of the packet. The packet identifier value indicates that the current packet contains configuration parameters. The unique identifier value is an identifier that the control computer has assigned to the plug-in 108C. The frame rate value indicates the frame rate at which the computer 103 sends actuator position data. The analog channel count value indicates the number of analog channels that the computer 103 uses. The binary channel count value indicates the number of binary channels that the computer 103 uses. Each channel type value is associated with one of the analog channels or binary channels and specifies the type of channel.

Thus, all control computers (such as computer 103) and all ROCs or ROC emulators (such as plug-in 108C) have a unique identifier value. The computer 103 can assign a new identifier value to any ROC or ROC emulator with which it communicates.

The ROC protocol also includes Halt and Start packets. When plug-in 108C receives a Configuration packet from computer 103, plug-in 108C sends a Halt packet to the computer 103 (block 606), carries out internal configuration processing (block 607), and then sends a Start packet (block 608) to computer 103 in order to start streaming transmission of Position data (block 610). The Halt packet and Start packet each comprise a routing header value, a byte count value, a packet identifier value that identifies the packet as either Halt type or Start type, and a CRC value.

In response to receiving a Start packet, computer 103 commences sending streaming actuator position data, as shown by block 610. Each Position packet comprises a routing header value, byte count value, packet identifier value, and one or more position values. In one preferred embodiment, the position values are formatted in a plurality of bytes consisting of the following sequence: low byte of a position value of a first channel; low byte of position value of second channel; most significant bits of first channel position value in a first nibble, and most significant bits of second channel position value in a second nibble. This sequence is repeated in the packet for each channel and position value. This sequence format is not required. Any other format that communicates position values may be used. Generally each position value comprises a 12-bit value as generated by converter 105.

Once streaming commences, plug-in 108C receives each Position packet, verifies the integrity of the packet based on the error check value, and sends an Acknowledge packet back to the computer 103, as shown by block 612.

During streaming, if plug-in 108C determines that a pre-determined timeout interval has passed without the plug-in receiving a Position packet, plug-in 108C enters a Disconnected state, as shown by block 616. An example of an acceptable pre-determined timeout interval is approximately 5 seconds. Similarly, if the computer 103 determines that it has not received acknowledgement for Position packets for a predetermined timeout period, computer 103 enters a Disconnected state, as shown by block 614. In an embodiment, in the Disconnect state, the Connect sequence is re-commenced. Thus, in the Disconnect state, plug-in 108C may revert to transmitting Request For Configuration packets.

Sound Synchronization

A performance may be synchronized to a pre-recorded sound track. In one embodiment, character motion information can be captured, manipulated and played back, thereby creating recorded performance information, in coordination with character representation information, to effect computer generated performance of part, or all of a character in sync with a sound recording. Any other part of the character can be performed live while the recorded performance information runs or is played back.

Computer Hardware Overview

Figure 7:
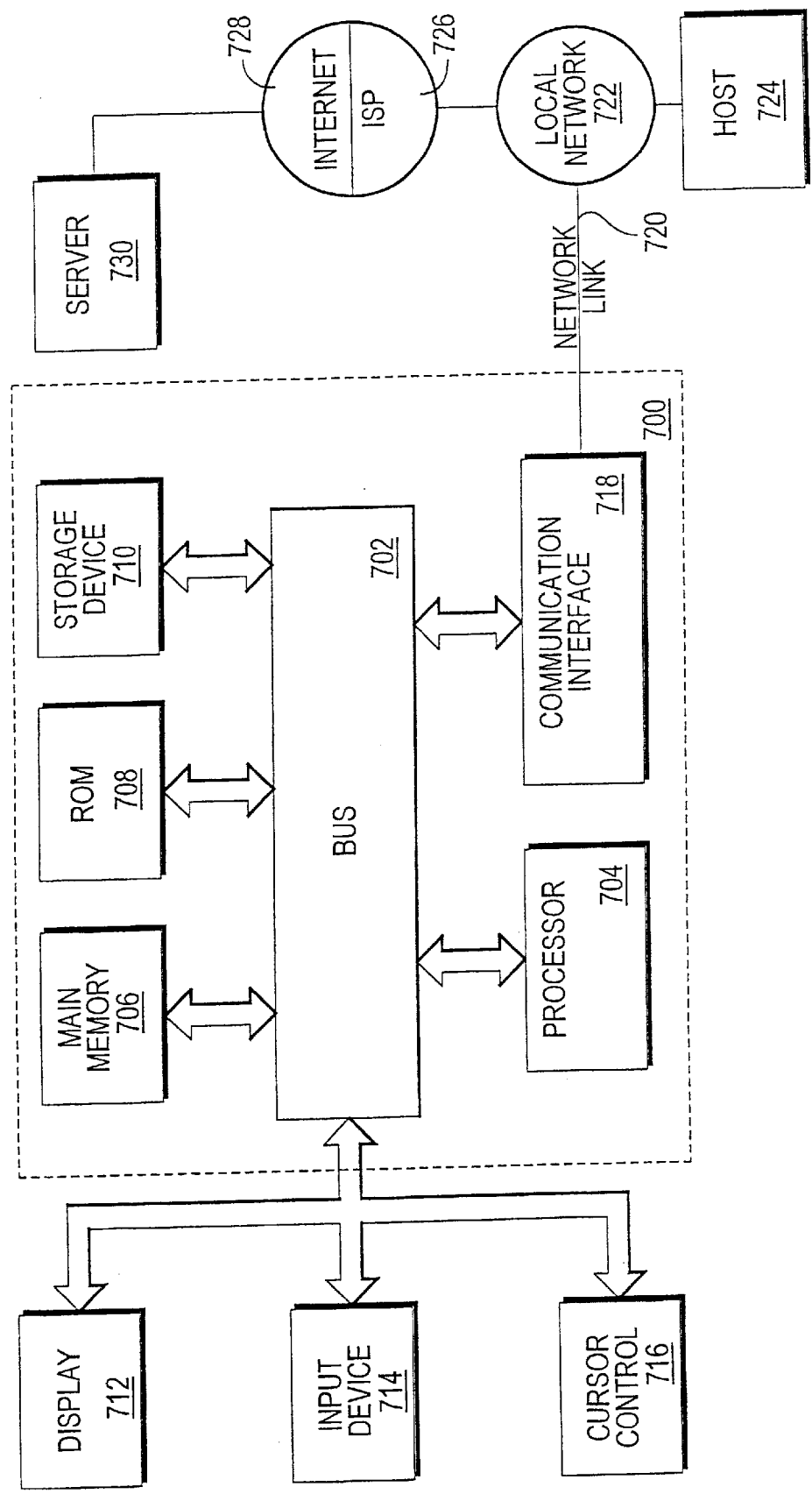
FIG. 7 is a diagram of a computer system that may be used to implement an embodiment.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are implemented by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application implements the techniques described herein.

The received code may be executed by processor 704 as it is received, and/or stored in storage device 710, or other non-volatile storage for later execution. In this manner, computer system 700 may obtain application code in the form of a carrier wave.

Using a system as described in this document, a performance control system is provided that offers users high-level configuration tools that are far easier to use than the low-level tools of the prior art. Also, the system offers a puppeteering paradigm that allows performances to be created in minutes, rather than days, as in the prior art. Rapid generation of expressions and performances is a key improvement.

Further, upgrades in functionality are achieved most efficiently through changes in software rather than hardware. Signal integrity is increased by minimizing the number of interfaces through which signals travel and the number of forms a signal must take while traveling through the system. The system operates using digital signals at all possible points. A standardized architecture using open, multipurpose interfaces and software improves flexibility and permits future enhancements and extensions. System operators, especially performers, are required to learn only a minimum number of software tools. The tools are quickly and easily accessible in the field environment. Modularization reduces maintenance.

Scope, Variations and Extensions

In the foregoing specification, the invention has been described with reference to specific embodiments thereof. It will, however, be evident that various modifications and changes and extensions may be made thereto without departing from the broader spirit and scope of the invention. For example, viewer 108 could be implemented in the form of a pair of virtual reality goggles, enabling performer 102 to have a heads-up display of a performance. Self-performing puppets could be created. Electromechanically actuated puppets or puppets could be configured with remote on-board computer and pre-loaded, pre-defined character documents stored in the electromechanically actuated puppet or puppet.

In another contemplated embodiment, viewer 108 runs Alive software from Protozoa, additionally or alternatively in conjunction with an Ascension motion-capture hardware arrangement. A first puppeteer uses performance control system 103B to perform a digital character's face, and a second puppeteer uses the Ascension hardware arrangement to perform the digital character's body, in real time. The performance is captured using the Alive motion capture software, and the performance data is later exported to Maya modeling and animation software (commercially available from Alias/Wavefront), running on a Silicon Graphics Octane computer under control of the Irix operating system. This provides graphics quality suitable for television productions and some feature films.

PCS 103B may include a collision avoidance mechanism that prevents a user or puppeteer from creating expressions or other movements that cause limbs or other elements of an electromechanically actuated puppet to collide or assume mechanically dangerous positions.

The specification and drawings are, accordingly, to be regarded in an illustrative rather than a restrictive sense.

---

APPENDIX -- DATA MEMBERS OF PRIMARY OBJECT CLASSES

```
class C_Abstract_Control : public C_PCS object, public C_Subject
    mutable float cached_normalized_neutral_
    mutable bool cached_normalized neutral_fresh_
    mutable float cached_normalized_value_
    mutable bool cached_normalized_value_fresh_
    list<C_Control_observer *>control_observers_
class C_Control_shared_data : public C_PCS_object_shared_data
    volatile bool inverted
    volatile int min
    volatile int max
    volatile int neutral
    volatile int override_value
    volatile bool overriding
    volatile int value
class C_Control : public C_Abstract_control, public
C_Preferences_observer
    C_Control_shared_data * csd_
    int device_type_
    int input_channel_
    bool must_delete_csd_
    string name_
class C_Control_group : public
C_PCS_object_group<C_Abstract_control>
    list<C_Control_group_observer *>control_group_observers
class C_Abstract_actuator : public C_PCS_object, public C_Subject
```

-continued

APPENDIX -- DATA MEMBERS OF PRIMARY OBJECT CLASSES

```
    mutable list<C_Actuator_observer *>actuator_observers_
    bool key_point_id_used_[MAX_ACTUATOR_KEY_POINTS]
    map<int, C_Key_point>keys_by_id_
    map<int, C_Key_point>keys_by_raw_
class C_Actuator_shared_data : public C_PCS_object_shared_data
    volatile float acceleration
    volatile float accuracy
    volatile float damping
    volatile float gain
    volatile int max
    volatile int min
    volatile int neutral
    volatile int override value
    volatile bool overriding
    volatile int scaling[ACTUATOR_SCALE_RANGE]
    volatile int tech_max
    volatile int tech_min
    volatile int value
    volatile float velocity
class C_Actuator : public C_Abstract_actuator
    C_Actuator_shared_data * asd_
    bool enabled_
    bool must_delete_asd_
    string name
    int output_channel_
    act_type_t physical_type_
class C_Actuator_group : public
C_PCS object_group<C_Abstract_actuator>
    list<C_Actuator_group_observer *>actuator_group_observers_
    bool tied_
class C_Abstract_expression : public C_PCS_object, public C_Subject,
    public C_Observer, public C_Control_observer, public
C_Actuator_observer
    static bool actuator_membership_[MAX_ACTUATORS] [MAX_EXPRESSIONS]
    list<C_Actuator_keys *>actuators_
    C_Abstract_control * control_
    static list<C_Abstract_expression *>
control_membership_[MAX_CONTROLS]
    list<C_Expression_observer *>expression_observers
    string name_
    static list<C_Nuance_observer *>nuance_observers_
    static map<C_Nuance_key, int, C_Nuance_key_cmp>nuance_table_
    C_ID_manager pose_id_manager
    map<int, C_Pose *>poses
    multimap<float, C_Pose *>poses_by_value_
    static C_Abstract_expression * solo1_
    static C_Abstract_expression * solo2_
    static list<C_Solo_observer *>5010_observers_
    float stored_proportion_
    float stored_proportion_complement
class C_Expression_shared_data : public C_PCS_object_shared_data
    volatile bool enabled
    volatile float max
    volatile float min
    volatile float override_value
    volatile bool overriding
    volatile float stored_neutral
class C_Expression : public C_Abstract_expression
    bool must_delete_shared_data_
    C_Expression_shared_data * shared_data_
class C_Expression_group : public
C_PCS_object_group<C_Abstract_expression>
    list<C_Expression_group_observer *>expression_group_observers_
class C_PCS_object
    C_PCS_object_allocator * allocator_
class C_PCS object_group
    list<C_PCS_object_group_observer<T>*>group_observers_
    int id
    static C_ID_manager id_manager_
    list<T *>list_
    string name_
```

What is claimed is:

1. A method of performing a computer graphic character live, comprising the steps of:

creating and storing character representation information in a first computer, the character representation information comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

receiving, at the first computer, performer movement information from the manual input device that receives live manual manipulations that are homologous to a puppetry performance and converts the manipulations into the performer movement information;

creating and storing character motion information based on combining the performer movement information with the character representation information;

receiving the character motion information at a second computer;

displaying the computer graphic character substantially synchronized to the live manual manipulations using the second computer and based on the character motion information.

2. A method as recited in claim 1, wherein the character representation information includes expression information defining one or more pre-configured character expressions; and wherein the step of creating and storing character motion information comprises creating and storing character motion information based on combining the performer movement information with the expression information.

3. A method as recited in claim 1:

wherein the character representation information comprises: control information defining a channel, group membership, limits, polarity, interface type, and motion value that may be associated with an expression that generates the movement information; and expression information defining one or more pre-configured character expressions that generate motion values associated with an actuator; and wherein the step of creating and storing character motion information comprises creating and storing character motion information based on combining the performer movement information with the expression information.

4. A method as recited in claim 1, wherein the step of creating and storing character motion information based on combining the performer movement information with the character representation information comprises the steps of:

creating and storing, in association with an expression generator, expression information defining one or more pre-defined character expressions;

receiving the performer movement information at the expression generator;

converting the performer movement information into the character motion information by applying the performer movement information to the expression information, which affects the motion value associated with actuators.

5. A method as recited in claim 1, wherein the step of creating and storing character motion information based on combining the performer movement information with the character representation information comprises the steps of:

creating and storing, in association with an expression generator, expression information defining one or more pre-defined character expressions, wherein each character expression comprises information defining changes in a visual appearance of parts of one of the characters to carry out in response to particular movement;

receiving the performer movement information at the expression generator;

converting the performer movement information into the character motion information by applying the performer movement information to the expression information.

6. A method as recited in claim 1, wherein the step of creating and storing character motion information based on combining the performer movement information with the character representation information comprises the steps of:

creating and storing, in association with an expression generator, one or more expression groups, in which each expression group comprises a plurality of sets of expression information, each set of expression information defining a pre-defined character expression that comprises information defining changes in a visual appearance of parts of one or more characters to carry out in response to particular movement;

receiving the performer movement information at the expression generator;

converting the performer movement information into the character motion information by concurrently applying the performer movement information to all the expression information of an expression group.

7. A method as recited in claim 1, wherein the step of creating and storing character motion information based on combining the performer movement information with the character representation information comprises the steps of:

creating and storing, in association with an expression generator, one or more control groups, each comprising a plurality of control objects that drives an expression of the character, each expression associated with and driving one or more actuators of elements of the character, wherein the expressions define a pre-defined character expression that comprises information defining changes in a visual appearance of parts of one or more characters to carry out in response to particular movement;

receiving the performer movement information at the expression generator;

converting the performer movement information into the character motion information by concurrently applying the performer movement information to all the control objects of a control group.

8. A method as recited in claim 1, wherein the step of creating and storing character motion information based on combining the performer movement information with the character representation information comprises the steps of:

creating and storing one or more actuator groups, in which each actuator group comprises a plurality of sets of actuator information, each set of expression information defining a pre-defined movable element of a character expression that results in changes in a visual appearance of parts of one or more characters when the actuator is actuated;

receiving the performer movement information at the expression generator;

converting the performer movement information into the character motion information by concurrently applying the performer movement information to all the actuator information of an actuator group.

9. A method as recited in claim 1, the character representation information includes expression information defining one or more pre-configured character expressions, and wherein the step of creating and storing character motion information comprises creating and storing character motion information based on combining the performer movement information with each of the expressions according to control channel assignments.

10. A method as recited in claim 1, the character representation information includes expression information defining one or more pre-configured character expressions, wherein each of the expressions comprises a list of character poses, and wherein the step of creating and storing character motion information comprises creating and storing character motion information by looking up a character motion value for a single channel of character motion information in a dataset defined by a set of poses and then combining the character motion value with character motion information of the expressions affecting the same actuator.

11. A method as recited in claim 1, further comprising the steps of:

creating and storing first character motion information as recorded performance information that captures a first live performance of the character;

receiving second character motion information that represents live manual manipulations of the manual input device during a second live performance of the character;

combining the first character motion information and the second character motion information to generate a current display of the computer graphic character substantially synchronized to the live manual manipulations using the second computer and based on the combined character motion information.

12. A method as recited in step 1, wherein the character motion information can be captured, manipulated and played back, thereby resulting in creating and storing recorded performance information, in coordination with character representation information, to effect computer generated performance of part, or all of a character in synchronization with a sound recording.

13. A method of performing a computer graphic character, comprising the steps of:

creating and storing character representation information in a computer, the character representation information comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and con figured to associate the one of the control data with the physical movement of the computer graphic character;

receiving, at the computer, performer movement information from a manual input device that receives live manual manipulations that are homologous to a puppetry performance;

creating and storing character motion information based on combining the performer movement information with the character representation information;

displaying the computer graphic character substantially synchronized to the live manual manipulations using the computer and based on the character motion information.

14. A computer system providing live performance control of one or more computer graphic characters, comprising:

a first computer comprising a character document that defines attributes of one or more characters and an expression generator that creates and stores character motion information based on attributes in the character documents, the character document comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

a transducer apparatus coupled to the first computer to provide digital information representing movement to the first computer as the transducer apparatus is moved homologous to a puppetry performance;

a second computer coupled to the first computer and comprising a character generating element configured to generate display information depicting the one or more computer graphic characters in response to and based on the digital information and the character motion information;

a graphic display device coupled to the second computer and configured to display the computer graphic characters using the display information.

15. A computer system as recited in claim 14, wherein the transducer apparatus comprises one or more manually operated actuators each associated with one or more movements of one or more parts of one of the characters.

16. A computer system as recited in claim 14, wherein the transducer apparatus comprises one or more transducers each associated with a control that drives an expression that drives one or more actuators that result in one or more movements of one or more parts of one of the characters.

17. A computer system as recited in claim 14, wherein the transducer apparatus comprises one or more manually operated transducer potentiometers each indirectly associated with one or more actuators that provide movement of a part of one of the characters, and further comprising:
   a multiplexer configured to receive analog signals from the transducer potentiometers and to generate a multiplexed analog output signal therefrom;
   an analog-to-digital converter configured to receive the multiplexed analog output signal from the multiplexer and to generate the digital information therefrom.

18. A computer system as recited in claim 14, further comprising a control program in the first computer and a character generator program in the second computer which, when executed by the computers, cause the computers to carry out the steps of:
   creating and storing character representation information in a first computer;
   receiving, at the first computer, performer movement information from a manual input device that receives live manual manipulations;
   creating and storing character motion information based on combining the performer movement information with the character representation information;
   receiving the character motion information at a second computer;
   displaying the computer graphic character substantially synchronized to the live manual manipulations using the second computer and based on the character motion information.

19. A computer system as recited in claim 18, wherein:
   the character representation information includes expression information defining one or more pre-configured character expressions; and
   the step of creating and storing character motion information comprises creating and storing character motion information based on combining the performer movement information with the expression information.

20. A computer system as recited in claim 18, wherein:
   the character representation information comprises: control information defining a channel, limits, polarity, interface type, group membership, and motion value associated with one or more expressions that generate character motion information; and expressions that contain a control and one or more actuators; wherein the actuators each define a channel, limits, group membership, tuning values, and nonlinear scaling; and
   the step of creating and storing character motion information comprises creating and storing character motion information based on combining the performer movement information with the expression information.

21. A computer system as recited in claim 18, wherein the step of creating and storing character motion information based on combining the performer movement information with the character representation information comprises the steps of:
   creating and storing, in association with an expression generator, expression information defining one or more pre-defined character expressions;
   receiving the performer movement information at the expression generator;
   converting the performer movement information into the character motion information by applying the performer movement information to the expression information.

22. A computer system as recited in claim 18, wherein the step of creating and storing character motion information based on combining the performer movement information with the character representation information comprises the steps of:
   creating and storing, in association with an expression generator, expression information defining one or more pre-defined character expressions, wherein each character expression comprises information defining changes in a visual appearance of parts of one of the characters to carry out in response to particular movement;
   receiving the performer movement information at the expression generator;
   converting the performer movement information into the character motion information by applying the performer movement information to the expression information.

23. A computer system providing live performance control of computer graphic characters, comprising:
   a computer that stores one or more character documents that define attributes of the characters and comprising an expression generator that creates and stores character motion information based on attributes in the character documents, the character document comprising
      information referencing one or more control data, each control data configured to represent a position of a manual input device used to manipulate the computer graphic character;
      information referencing one or more virtual actuator data configured to represent a position of a specified portion of the computer graphic character, each virtual actuator data associated with a communication channel over which one of the control data is received;
      one or more expression information, each expression information associated with a physical movement of the computer graphic character specified by one of the control data and executed by one or more corresponding virtual actuator data and configured to associate the one of the control data with the physical movement of the computer graphic character;
   a transducer apparatus coupled to the computer to provide digital information representing movement to the computer as the transducer apparatus is moved homologous to a puppetry performance;
   a character generating element in the computer that is configured to generate display information depicting the computer graphic characters in response to and based on the digital information and the character motion information received via a local communications link;
   a graphic display device coupled to the computer and configured to display the computer graphic characters using the display information and using a character generation application and a 3D display application.

24. A computer system providing live performance control of computer graphic characters, comprising:
   a computer that stores a character document that defines attributes of one or more characters and comprising an expression generator that creates and stores character motion information based on attributes in the character document, the character document comprising
      information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

a character generating element in the computer that is configured to generate display information depicting the computer graphic characters in response to and based on the character motion information and digital information that is received from a transducer apparatus coupled to the computer, wherein the digital information represents movement to the computer as the transducer apparatus is moved homologous to a puppetry performance;

a graphic display device coupled to the computer and configured to display the computer graphic characters using the display information.

25. A computer-readable medium carrying one or more sequences of instructions for performing a computer graphic character live, wherein execution of the one or more sequences of instructions by one or more processors causes the one or more processors to perform the steps of:

creating and storing character representation information in a first computer, the character representation information comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

receiving, at the first computer, performer movement information from a manual input device that receives live manual manipulations homologous to a puppetry performance;

creating and storing character motion information based on combining the performer movement information with the character representation information;

receiving the character motion information at a second computer;

displaying the computer graphic character substantially synchronized to the live manual manipulations using the second computer and based on the character motion information.

26. A method of producing a motion picture that includes a performance of a computer graphic character, comprising the steps of:

creating and storing character representation information in a first computer, the character representation information comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

receiving, at the first computer, performer movement information from a manual input device that receives live manual manipulations homologous to a puppetry performance and converts the manipulations into the performer movement information;

creating and storing character motion information based on combining the performer movement information with the character representation information;

receiving the character motion information at a second computer;

creating and storing a motion picture medium that includes a display of the computer graphic character substantially synchronized to the live manual manipulations using the second computer and based on the character motion information.

27. A method of creating and storing information that defines a computer graphic character, comprising the steps of:

creating and storing character representation information in a first computer, the character representation information comprising information referencing one or more control data, each control data configured to represent a position of a manual input device used to manipulate the computer graphic character;

information referencing one or more virtual actuator data configured to represent a position of a specified portion of the computer graphic character, each virtual actuator data associated with a communication channel over which one of the control data is received;

one or more expression information, each expression information associated with a physical movement of the computer graphic character specified by one of the control data and executed by one or more corresponding virtual actuator data and configured to associate the one of the control data with the physical movement of the computer graphic character;

receiving, at the first computer, performer movement information from a manual input device that receives live manual manipulations homologous to a puppetry performance and converts the manipulations into the performer movement information;

creating and storing character motion information based on combining the performer movement information with the character representation information;

receiving the character motion information at a second computer;

creating and storing a character model based on a display of the computer graphic character that is substantially synchronized to the live manual manipulations using the second computer and based on the character motion information.

28. A computer system comprising:

a first computer comprising:
   a network interface;
   a memory;
   one or more processors connected to the network interface; the one or more processors configured for
      creating and storing character representation information, the character representation information comprising
         information referencing one or more control data, each control data configured to represent a position of a manual input device used to manipulate the computer graphic character;
         information referencing one or more virtual actuator data configured to represent a position of a specified portion of the computer graphic character, each virtual actuator data associated with a communication channel over which one of the control data is received;
         one or more expression information, each expression information associated with a physical movement of the computer graphic character specified by one of the control data and executed by one or more corresponding virtual actuator data and configured to associate the one of the control data with the physical movement of the computer graphic character;
      receiving performer movement information from a manual input device that receives live manual manipulations homologous to a puppetry performance;
      creating and storing character motion information based on combining the performer movement information with the character representation information;

a second computer comprising:
   a network interface;
   a memory;
   one or more processors connected to the network interface; the one or more processors configured for
      receiving the character motion information;
      displaying the computer graphic character substantially synchronized to the live manual manipulations based on the character motion information.

* * * * *